United States Patent [19]

Lauk

[11] Patent Number: 5,631,352
[45] Date of Patent: May 20, 1997

[54] AZODYES CONTAINING A BRIDGE MEMBER BASED ON DIAMINO-SUBSTITUTED TRIAZINES

[75] Inventor: Urs Lauk, Zürich, Switzerland

[73] Assignee: Ciba-Geigy Corporation, Tarrytown, N.Y.

[21] Appl. No.: 460,174

[22] Filed: Jun. 2, 1995

[30] Foreign Application Priority Data

Jun. 20, 1994 [CH] Switzerland ............................. 1952/94

[51] Int. Cl.⁶ .................... C09B 35/02; C09B 35/00; C09B 31/00; C09B 67/22; D06P 1/06; D06P 1/10

[52] U.S. Cl. .................. 534/797; 534/573; 534/627; 534/628; 534/624; 534/634; 534/637; 534/638; 534/703; 534/730; 534/796; 534/799

[58] Field of Search .................... 534/796, 797, 534/638, 799, 573 M, 634, 637, 628, 627, 703, 730, 624

[56] References Cited

U.S. PATENT DOCUMENTS

| | | | |
|---|---|---|---|
| 4,465,627 | 8/1984 | Pedrazzi | 534/796 X |
| 4,594,410 | 6/1986 | Pedrazzi | 534/701 |
| 4,654,384 | 3/1987 | Ramantahan et al. | 534/604 |
| 4,670,547 | 6/1987 | Lehr | 534/637 |
| 4,742,160 | 5/1988 | Dore et al. | 534/605 |
| 4,764,175 | 8/1988 | Dore et al. | 8/437 |
| 4,975,118 | 12/1990 | Mayer et al. | 106/22 |
| 4,997,919 | 3/1991 | Schaulin | 534/637 |
| 5,006,128 | 4/1991 | Pedrazzi et al. | 8/437 |
| 5,320,648 | 6/1994 | McMullan et al. | 8/639 |
| 5,324,330 | 6/1994 | Schaulin et al. | 8/639 |
| 5,328,995 | 7/1994 | Schaulin et al. | 534/797 |
| 5,484,899 | 1/1996 | Deitz et al. | 534/618 |

FOREIGN PATENT DOCUMENTS

| | | | |
|---|---|---|---|
| 179549 | 4/1986 | European Pat. Off. | 534/796 |
| 0055496 | 11/1943 | Netherlands | 534/797 |
| 2019873 | 11/1979 | United Kingdom | 534/637 |
| 2149808 | 6/1985 | United Kingdom | 534/797 |
| 2158837 | 11/1985 | United Kingdom | 534/797 |
| 2166147 | 4/1986 | United Kingdom | 534/797 |
| 2266893 | 11/1993 | United Kingdom | 534/797 |

*Primary Examiner*—Floyd D. Higel
*Attorney, Agent, or Firm*—Kevin T. Mansfield

[57] ABSTRACT

Dye mixtures which comprise at least one anionic acid dye of the formula

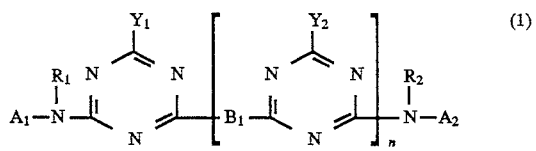

together with at least one anionic acid dye of the formula

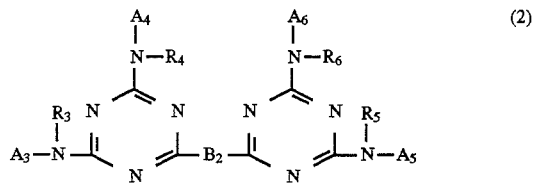

in which the substituents are as defined in claim 1, and the novel dyes of the formulae (1) and (2) are direct dyes for cellulosic fibre materials in particular. They have a high heat stability and are particularly suitable for one-bath, one-stage dyeing of polyester/cotton blend fabrics with a disperse dye for the polyester fibres under the dyeing conditions for polyester fibres.

8 Claims, No Drawings

AZODYES CONTAINING A BRIDGE MEMBER BASED ON DIAMINO-SUBSTITUTED TRIAZINES

The present invention relates to novel mixtures of azo dyes, novel azo dyes, processes for their preparation and their use for dyeing and printing fibre materials, in particular textile fibre materials.

The object on which the present invention was based was to discover dye mixtures and dyes which are suitable for dyeing fibre materials containing nitrogen and fibre materials containing hydroxyl groups, in particular cellulosic fibre materials, have good fastness properties and have a high heat stability.

It has now been found that the following azo dye mixtures and azo dyes meet these requirements.

The present invention relates to dye mixtures which comprise at least one anionic acid dye of the formula

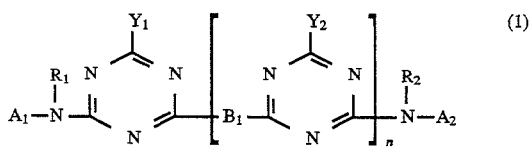

together with at least one anionic acid dye of the formula

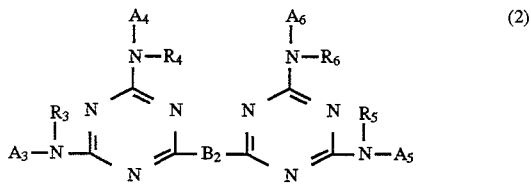

in which $R_1$, $R_2$, $R_3$, $R_4$, $R_5$ and $R_6$ independently of one another are hydrogen or $C_1$–$C_4$alkyl, $B_1$ and $B_2$ independently of one another are an aliphatic or aromatic bridge member, $A_1$, $A_2$, $A_3$, $A_4$, $A_5$ and $A_6$ independently of one another are the radical of a monoazo- or disazo dye or the radical of a metal complex azo dye, n is the number 0 or 1 and $Y_1$ and $Y_2$ independently of one another are a radical of the formula

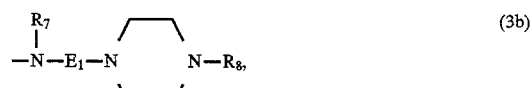

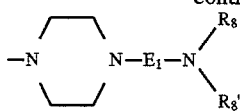

in which $R_7$, $R_8$ and $R_8'$ independently of one another are hydrogen or substituted or unsubstituted C1–$C_8$alkyl and $E_1$ is substituted or unsubstituted $C_2$–$C_8$alkylene which is uninterrupted or interrupted by one or more groups -O-, or substituted or unsubstituted $C_5$–$C_7$cycloalkylene, $C_5$–$C_7$-cycloalkylene-$C_1$–$C_8$alkylene or $C_1$–$C_8$alkylene-$C_5$–$C_7$-cycloalkylene.

$C_1$–$C_4$Alkyl $R_1$, $R_2$, $R_3$, $R_4$, $R_5$ and $R_6$ is, for example, methyl, ethyl, propyl, isopropyl, butyl, sec-butyl, tert-butyl or isobutyl, in particular methyl or ethyl, preferably methyl.

Preferably, $R_1$, $R_2$, $R_3$, $R_4$, $R_5$ and $R_6$ are hydrogen, methyl or ethyl, in particular hydrogen.

$C_1$–$C_8$Alkyl $R_7$, $R_8$ and $R_8'$ is, for example, methyl, ethyl, propyl, isopropyl, butyl, sec-butyl, tert-butyl, isobutyl, or straight-chain or branched pentyl, hexyl, heptyl or octyl. $C_1$–$C_8$Alkyl radicals $R_7$, $R_8$ and $R_8'$ can be further substituted, for example by hydroxyl, $C_1$–$C_4$alkoxy, halogen, amino or sulfato, in particular by hydroxyl, $C_1$–$C_4$alkoxy or amino.

Preferably, $R_7$, $R_8$ and $R_8'$ are hydrogen or $C_1$–$C_4$alkyl which is unsubstituted or substituted by hydroxyl, $C_1$–$C_4$alkoxy or amino.

The $C_2$–$C_8$alkylene radical $E_1$ can be interrupted by one or more groups -O-, in particular by one to three, and preferably by one or two groups -O-. The radicals which are not interrupted by a group -O- are preferred. Possible substituents for the $C_2$–$C_8$alkylene radical $E_1$ are, for example, hydroxyl, $C_1$–$C_4$alkoxy, halogen, amino or sulfato, in particular hydroxyl or $C_1$–$C_4$alkoxy. Examples of such $C_2$–$C_8$alkylene radicals are 1,2-ethylene, 1,2-propylene, 1,3-propylene and 1,3-propylene which is substituted by hydroxyl in the 2-position.

The $C_5$–$C_7$cycloalkylene, $C_5$–$C_7$cycloalkylen-$C_1$–$C_8$alkylene or $C_1$–$C_8$alkylene-$C_5$–$C_7$cycloalkylene radical $E_1$ can be substituted in the alkylene radical, for example by hydroxyl or $C_1$–$C_4$alkoxy and in the cycloalkyl ring, for example by $C_1$–$C_4$alkyl, in particular by methyl. Alkyl is to be understood here as meaning, in particular, cyclohexyl. $C_5$–$C_7$Cycloalkylene-$C_1$–Calkylene and $C_1$–$C_8$alkylene-$C_5$–$C_7$cycloalkylene are, in particular, cyclohexylene-methylene and methylene-cyclohexylene, which can be substituted by $C_1$–$C_4$alkyl in the cyclohexyl ring.

The radical $E_1$ is preferably $C_2$–$C_8$alkylene, which is as defined and preferred above.

The radicals $Y_1$ and $Y_2$ preferably have identical meanings.

Aliphatic or aromatic bridge members for $B_1$ and $B_2$ are, for example, the following:

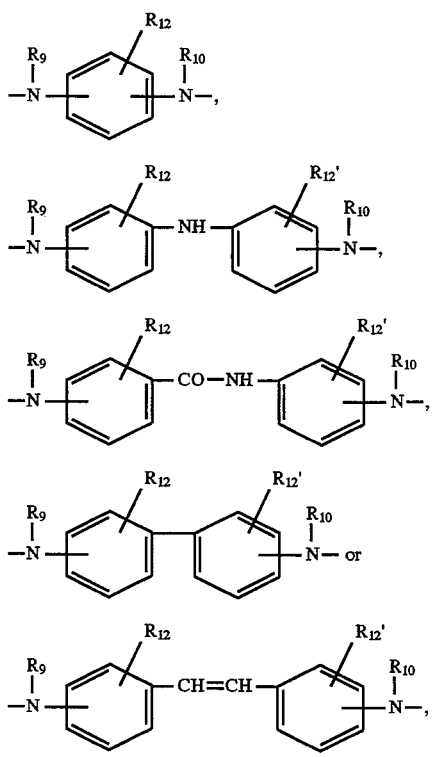

in which

R$_9$, R$_{10}$ and R$_{11}$ independently of one another are hydrogen or C$_1$–C$_8$alkyl which is unsubstituted or substituted by hydroxyl or C$_1$–C$_4$alkoxy, R$_{12}$ and R$_{12}$' independently of one another are hydrogen, C$_1$–C$_4$alkyl, C$_1$–C$_4$alkoxy, C$_2$–C$_4$alkanoylamino, halogen, sulfo or carboxyl and E$_2$ and E$_3$ independently of one another are C$_2$–C$_8$alkylene which is unsubstituted or substituted by hydroxyl or C$_1$–C$_4$alkoxy and uninterrupted or interrupted by one or more groups -O-, or C$_5$–C$_7$cycloalkylene, C$_5$–C$_7$cycloalkylene-C$_1$–C$_8$alkylene or C$_1$–C$_8$alkylene-C$_5$–C$_7$cycloalkylene which are unsubstituted or substituted by C$_1$–C$_4$alkyl in the cycloalkyl ring, R$_9$, R$_{10}$ and R$_{11}$ are preferably hydrogen, methyl or ethyl, in particular hydrogen.

R$_{12}$ and R$_{12}$' are preferably hydrogen or sulfo. In the bridge member of the formula (5h), R$_{12}$ and R$_{12}$' are preferably sulfo.

The C$_2$–C$_8$alkylene radicals E$_2$ and E$_3$ can be interrupted by one or more groups -O-, in particular by one to three, and preferably by one or two groups -O-. The radicals which are not interrupted by a group -O- are preferred. Possible substituents for the C$_2$–C$_8$alkylene radicals E$_2$ and E$_3$ are, for example, hydroxyl, C$_1$–C$_4$alkoxy, halogen, amino or sulfato, in particular hydroxyl or C$_1$–C$_4$alkoxy. Examples of such C$_2$–C$_8$alkylene radicals are 1,2-ethylene, 1,2-propylene, 1,3-propylene, 1,3-propylene which is substituted by hydroxyl in the 2-position and the radical of the formula —(CH$_2$)$_3$—O—(CH$_2$)$_4$—O—(CH$_2$)$_3$—.

The C$_5$–C$_7$cycloalkylene, C$_5$–C$_7$cycloalkylene-C$_1$–C$_8$alkylene or C$_1$–C$_8$alkylene-C$_5$–C$_7$cycloalkylene radicals E$_2$ and E$_3$ can be substituted in the alkylene radical, for example by hydroxyl or C$_1$–C$_4$alkoxy, and in the cycloalkyl ring, for example by C$_1$–C$_4$alkyl, in particular by methyl. Cycloalkyl here is understood as meaning, in particular, cyclohexyl. C$_5$–C$_7$Cycloalkylene-C$_1$–C$_8$alkylene and C$_1$–C$_8$alkylene-C$_5$–C$_7$cycloalkylene are, in particular, cyclohexylene-methylene and methylene-cyclohexylene, which can be substituted by C$_1$–C$_4$alkyl in the cyclohexyl ring.

The radicals E$_2$ and E$_3$ are preferably C$_2$–C$_8$alkylene, which is as defined and preferred above.

Particularly preferred bridge members B$_1$ and B$_2$ are those of the formulae (5a), (5b), (5c) and (5h), in particular those of the formulae (5a), (5b) and (5c).

Radicals A$_1$, A$_2$, A$_3$, A$_4$, A$_5$ and A$_6$ of a monoazo or disazo dye or of a metal complex azo dye preferably contain diazo components and coupling components of the benzene or naphthalene series. Metal complex azo dyes are, in particular, copper complex azo dyes.

Substituents of the radicals A$_1$, A$_2$, A$_3$, A$_4$, A$_5$ and A$_6$ are the customary substituents for azo dyes. Examples are the following: sulfo; carboxyl; hydroxyl; carbamoyl; cyano; amino; halogen, for example fluorine or, in particular, chlorine; ureido which is unsubstituted or mono- or disubstituted by C$_1$–C$_4$alkyl in the terminal amino group; C$_1$–C$_4$alkyl or C$_1$–C$_4$alkoxy which are unsubstituted or substituted by hydroxyl;

C$_2$–C$_6$alkanoylamino which is unsubstituted or substituted by hydroxyl or C$_1$–C$_4$alkoxy in the alkyl part; and phenylamino or benzoylamino which are unsubstituted or substituted by C$_1$–C$_4$alkyl, C$_2$–C$_4$alkoxy, C$_2$–C$_4$alkanoylamino, sulfo, carboxyl, halogen, cyano or ureido in the phenyl ring.

The radicals A$_1$, A$_2$, A$_3$, A$_4$, A$_5$ and A$_6$ are preferably those of the formula

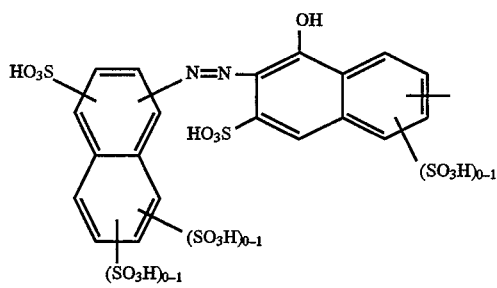

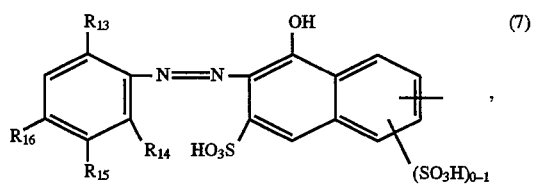

in which

R$_{13}$, R$_{14}$, R$_{15}$ and R$_{16}$ independently of one another are hydrogen, sulfo, carboxyl, carbamoyl, halogen, cyano or ureido, C$_1$–C$_4$alkyl or C$_1$–C$_4$alkoxy which are unsubstituted or substituted by hydroxyl, or C$_2$–C$_4$alkanoylamino which is unsubstituted or substituted by hydroxyl or C$_1$–C$_4$alkoxy in the alkyl part;

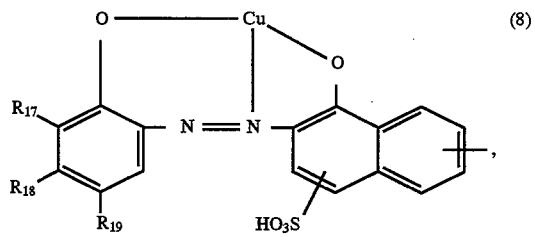

in which

R$_{17}$, R$_{18}$ and R$_{19}$ have the definitions assigned above to R$_{13}$, R$_{14}$, R$_{15}$ and R$_{16}$;

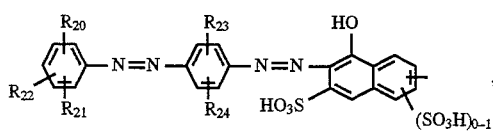  (9)

in which
$R_{20}$, $R_{21}$, $R_{22}$, $R_{23}$ and $R_{24}$ have the definitions assigned above to $R_{13}$, $R_{14}$, $R_{15}$ and $R_{16}$;

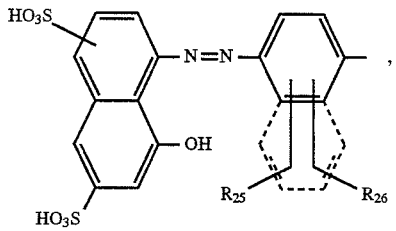  (10)

in which
$R_{25}$ and $R_{26}$ have the definitions assigned above to $R_{13}$, $R_{14}$, $R_{15}$ and $R_{16}$;

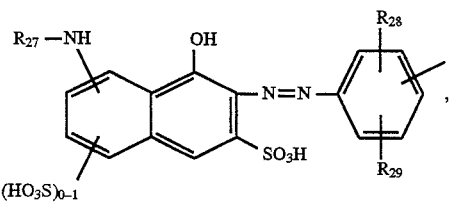  (11)

in which
$R_{27}$ is hydrogen, $C_2$–$C_6$alkanoyl which is unsubstituted or substituted by hydroxyl or $C_1$–$C_4$alkoxy, or phenyl or benzoyl which are unsubstituted or substituted by $C_1$–$C_4$alkyl, $C_1$–$C_4$alkoxy, $C_2$–$C_4$ alkanoylamino, sulfo, carboxyl, halogen, cyano or ureido in the phenyl ring, and
$R_{28}$ and $R_{29}$ have the definitions assigned above to $R_{13}$, $R_{14}$, $R_{15}$ and $R_{16}$;

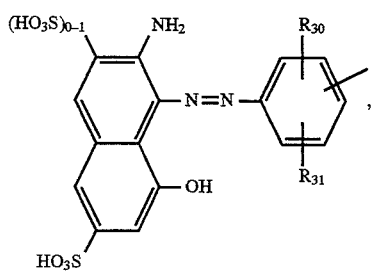  (12)

in which
$R_{30}$ and $R_{31}$ have the definitions assigned above to $R_{13}$, $R_{14}$, $R_{15}$ and $R_{16}$;

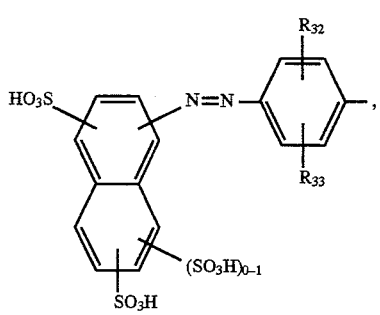  (13)

in which
$R_{32}$ and $R_{33}$ have the definitions assigned above to $R_{13}$, $R_{14}$, $R_{15}$ and $R_{16}$;

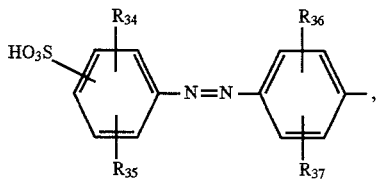  (14)

in which
$R_{34}$, $R_{35}$, $R_{36}$ and $R_{37}$ have the definitions assigned above to $R_{13}$, $R_{14}$, $R_{15}$ and $R_{16}$; or

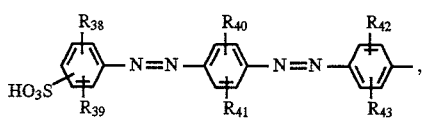  (15)

in which
$R_{38}$, $R_{39}$, $R_{40}$, $R_{41}$, $R_{42}$ and $R_{43}$ have the definitions assigned above to $R_{13}$, $R_{14}$, $R_{15}$ and $R_{16}$.

Preferred radicals of the formula (7) are those in which $R_{13}$, $R_{14}$, $R_{15}$ and $R_{16}$ independently of one another are hydrogen, sulfo, carboxyl, $C_1$–$C_4$alkyl or $C_1$–$C_4$alkoxy.

Preferred radicals of the formula (8) are those in which $R_{17}$, $R_{18}$ and $R_{19}$ are hydrogen, preferably at least one of these substituents being sulfo.

Preferred radicals of the formula (9) are those in which $R_{20}$, $R_{21}$, $R_{22}$, $R_{23}$ and $R_{24}$ are hydrogen or sulfo, preferably at least one of these substituents being sulfo.

Preferred radicals of the formula (10) are those in which $R_{25}$ and $R_{26}$ are hydrogen, sulfo or $C_1$–$C_4$alkyl or $C_1$–$C_4$alkoxy which are unsubstituted or substituted by hydroxyl.

Preferred radicals of the formula (11) are those in which $R_{27}$ is benzoyl which is unsubstituted or substituted by $C_1$–$C_4$alkyl, $C_1$–$C_4$alkoxy, $C_2$–$C_4$alkanoylamino, sulfo, carboxyl, halogen, cyano or ureido in the phenyl ring and $R_{28}$ and $R_{29}$ are hydrogen or sulfo.

Preferred radicals of the formula (12) are those in which $R_{30}$ and $R_{30}$ are hydrogen or sulfo.

Preferred radicals of the formula (13) are those in which $R_{32}$ and $R_{33}$ are hydrogen, sulfo, $C_1$–$C_4$alkyl or $C_1$–$C_4$alkoxy.

Preferred radicals of the formula (14) are those in which $R_{34}$, $R_{35}$, $R_{36}$ and $R_{37}$ are hydrogen, $C_1$–$C_4$alkyl, $C_1$–$C_4$alkoxy or $C_2$–$C_4$alkanoylamino.

Preferred radicals of the formula (15) are those in which $R_{38}$, $R_{39}$, $R_{40}$, $R_{41}$, $R_{42}$ and $R_{43}$ are hydrogen, $C_1$–$C_4$alkyl, $C_1$–$C_4$alkoxy or $C_2$–$C_4$alkanoylamino. Preferably, one of the radicals $R_{40}$ and $R_{41}$ here is sulfo.

Particularly preferred radicals $A_1$, $A_2$, $A_3$, $A_4$, $A_5$ and $A_6$ are those of the formulae (6), (7), (8), (9), (10), (11), (12) and (14), preferably radicals of the formulae (6), (7), (9), (11), (12), and (14), in particular the radical of the formula (6) or (7).

The radicals $A_3$ and $A_5$ and the radicals $A_4$ and $A_6$ in the dyes of the formula (2) in each case preferably have identical meanings.

The radicals $A_1$ and $A_2$ in the dyes of the formula (1) preferably have identical meanings.

$A_1$, $A_2$, $A_3$, $A_4$, $A_5$ and $A_6$ particularly preferably have identical meanings.

n is preferably the number 0.

Preferred dye mixtures are those in which $R_7$, $R_8$ and $R_8'$ independently of one another are hydrogen or $C_1$–$C_8$alkyl which is unsubstituted or substituted by hydroxyl or $C_1$–$C_4$alkoxy and $E_1$ is $C_2$–$C_8$alkylene which is unsubstituted or substituted by hydroxyl or $C_1$–$C_4$alkoxy and uninterrupted or interrupted by one or more groups -O-, or $C_5$–$C_7$cycloalkylene, $C_5$–$C_7$cycloalkylene-$C_1$–$C_8$alkylene or $C_1$–$C_8$alkylene-$C_5$–$C_7$cycloalkylene which are unsubstituted or substituted by $C_1$–$C_4$alkyl in the cycloalkyl ring.

n here is preferably the number 0 and the radicals $R_1$, $R_2$, $R_3$, $R_4$, $R_5$ and $R_6$, $B_1$ and $B_2$, and $A_1$, $A_2$, $A_3$, $A_4$, $A_5$ and $A_6$ are as defined and preferred above.

Particularly preferred dye mixtures are those in which $R_7$, $R_8$ and $R_8'$ are hydrogen or $C_1$–$C_4$alkyl which is unsubstituted or substituted by hydroxyl or $C_1$–$C_4$alkoxy and $E_1$ is $C_2$–$C_8$alkylene, which can be interrupted by one or two groups -O- and is unsubstituted or substituted by hydroxyl or $C_1$–$C_4$alkoxy.

n here is preferably the number 0 and the radicals $R_1$, $R_2$, $R_3$, $R_4$, $R_5$ and $R_6$, $B_1$ and $B_2$, and $A_1$, $A_2$, $A_3$, $A_4$, $A_5$ and $A_6$ are as defined and preferred above.

An interesting group of dye mixtures is formed by those which comprise an anionic acid dye of the formula

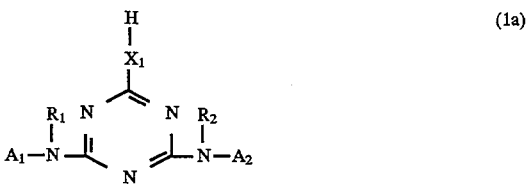

(1a)

together with an anionic acid dye of the formula

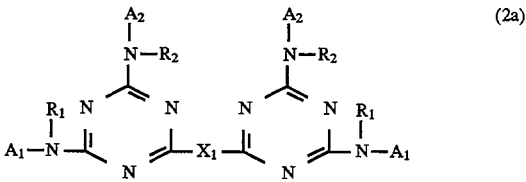

(2a)

in which
$X_1$ is a radical of the formula

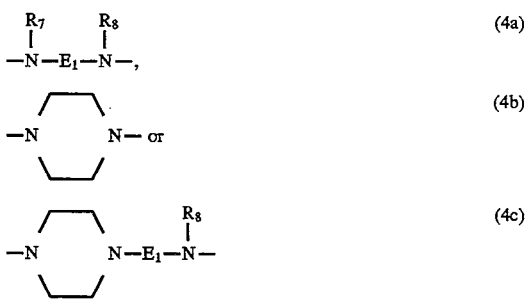

(4a)

(4b)

(4c)

in which
$R_7$ and $R_8$ are hydrogen or $C_1$–$C_8$alkyl which is unsubstituted or substituted by hydroxyl or $C_1$–$C_4$alkoxy and
$E_1$ is $C_2$–$C_8$alkylene which is unsubstituted or substituted by hydroxyl or $C_1$–$C_4$alkoxy and uninterrupted or interrupted by one or more groups -O-, or $C_5$–$C_7$-cycloalkylene,
$C_5$–$C_7$cycloalkylene-$C_1$–$C_8$alkylene or $C_1$–$C_8$alkylene-$C_5$–$C_7$cycloalkylene which are unsubstituted or substituted by $C_1$–$C_4$alkyl in the cycloalkyl ring, and $A_1$, $A_2$, $R_1$ and $R_2$ are as defined and preferred above.

The radicals with identical designations in the dyes of the formulae (1a) and (2a) also have identical meanings here.

$R_7$ and $R_8$ are preferably hydrogen or $C_1$–$C_4$alkyl which is unsubstituted or substituted by hydroxyl or $C_1$–$C_4$alkoxy.

$E_1$ is preferably $C_2$–$C_8$alkylene which is unsubstituted or substituted by hydroxyl or $C_1$–$C_4$alkoxy.

$R_1$ and $R_2$ are preferably hydrogen.

$A_1$ and $A_2$ are preferably radicals of the formulae (6) to (15), in particular those of the formulae (6), (7), (8), (9), (10), (11), (12) and (14), preferably those of the formula (6), (7), (9), (11), (12) and (14). $A_1$ and $A_2$ are particularly preferably radicals of the formula (6) or (7).

$A_1$ and $A_2$ preferably have identical meanings.

Preferred dye mixtures of the dyes of the formulae (1a) and (2a) are those in which $R_7$ and $R_8$ are hydrogen or $C_1$–$C_4$alkyl which is unsubstituted or substituted by hydroxyl or $C_1$–$C_4$alkoxy, $E_1$ is $C_2$–$C_8$alkylene which is unsubstituted or substituted by hydroxyl or $C_1$–$C_4$alkoxy and $A_1$ and $A_2$ in particular have identical meanings.

Particularly preferred dye mixtures of the dyes of the formulae (1a) and (2a) are those in which $R_7$ and $R_8$ are hydrogen or $C_1$–$C_4$alkyl which is unsubstituted or substituted by hydroxyl or $C_1$–$C_4$alkoxy, $E_1$ is $C_2$–$C_8$alkylene which is unsubstituted or substituted by hydroxyl or $C_1$–$C_4$alkoxy, $R_1$ and $R_2$ are hydrogen and $A_1$ and $A_2$ are radicals of the formulae (6) to (15), in particular those of the formulae (6), (7), (8), (9), (10), (11), (12) and (14), preferably those of the formulae (6), (7), (9), (11), (12) and (14).

$A_1$ and $A_2$ here are particularly preferably radicals of the formula (6) or (7). $A_1$ and $A_2$ preferably have identical meanings.

Radicals $X_1$ of the formula (4a) are of particular interest.

The present invention furthermore relates to the novel anionic acid dyes of the formula (1) in which $R_1$, $R_2$, $B_1$, $A_1$, $A_2$, $Y_1$, $Y_2$ and n are as defined and preferred above.

Preferred dyes of the formula (1) are those in which $R_1$ and $R_2$ are hydrogen or $C_1$–$C_4$alkyl, in particular hydrogen, $B_1$ is a bridge member of the formulae (5a) to (5h), $A_1$ and $A_2$ are radicals of the formulae (6) to (15), in particular those of the formulae (6), (7), (8), (9), (10), (11), (12) and (14), preferably those of the formulae (6), (7), (9), (11), (12) and (14), $R_7$, $R_8$ and $R_8'$ are hydrogen or $C_1$–$C_4$alkyl which is unsubstituted or substituted by hydroxyl or $C_1$–$C_4$alkoxy and $E_1$ is $C_2$–$C_8$alkylene which is unsubstituted or substituted by hydroxyl or $C_1$–$C_4$alkoxy.

Radicals $A_1$ and $A_2$ of the formula (6) or (7) are of particular interest here. $A_1$ and $A_2$ preferably have identical meanings. n is, in particular, the number 0.

Particularly preferred dyes of the formula (1) in which
n is the number 0,
are those in which
$R_1$ and $R_2$ are hydrogen,
$A_1$ and $A_2$ are radicals of the formulae (7), (8), (9), (10), (11), (12) and (14), preferably those of the formulae (7), (9), (11), (12) and (14), and in particular those of the formula (7), $R_7$, $R_8$ and $R_8'$ are hydrogen or $C_1$–$C_4$alkyl which is unsubstituted or substituted by hydroxyl or $C_1$–$C_4$alkoxy and $E_1$ is $C_2$–$C_8$alkylene which is unsubstituted or substituted by hydroxyl or $C_1$–$C_4$alkoxy, and in which
the radicals $A_1$ and $A_2$ have identical meanings.

Especially preferred dyes of the formula (1) in which
n is the number 0,
are those in which $A_1$ and $A_2$ are radicals of the formula (7), in particular radicals of the formula

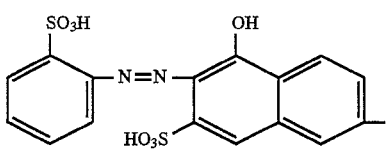

$R_1$, $R_2$ and $Y_1$ here are as defined and preferred above. $R_1$ and $R_2$ here are preferably hydrogen. $Y_1$ here is preferably a radical of the formula (3a) in which $R_7$, $R_8$ and $R_8'$, in particular, are hydrogen, and $E_1$, in particular, is $C_2$–$C_8$alkylene which is unsubstituted or substituted by hydroxyl or $C_1$–$C_4$alkoxy.

$E_1$ here is preferably $C_2$–$C_8$alkylene, in particular propylene.

Especially preferred dyes of the formula (1) in which n is the number 1 are those in which $A_1$ and $A_2$ are radicals of the formula (6), in particular radicals of the formula

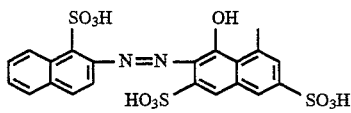

$R_1$, $R_2$, $B_1$, $Y_1$ and $Y_2$ here are as defined and preferred above. $R_1$ and $R_2$ here are preferably hydrogen. $Y_1$ and $Y_2$ here are preferably radicals of the formula (3e) in which $R_8$ and $R_8'$, in particular, are hydrogen and $E_1$, in particular, is $C_2$–$C_8$alkylene which is unsubstituted or substituted by hydroxyl or $C_1$–$C_4$alkoxy.

$E_1$ here is preferably $C_2$–$C_8$alkylene, in particular ethylene.

$B_1$ here is preferably a radical of the formula (5d) in which $R_9$, $R_{10}$ and $R_{12}$ in particular are hydrogen.

The amino groups of the radical of the formula (5d) are preferably in the para-position relative to one another.

Another group of interesting dyes of the formula (1) is formed by the dyes of the formula (1a) in which $R_1$, $R_2$, $X_1$, $A_1$ and $A_2$ are as defined and preferred under formula (1a).

The present invention furthermore relates to novel anionic acid dyes of the formula (2) in which $R_3$, $R_4$, $R_5$, $R_6$, $B_2$, $A_3$, $A_4$, $A_5$ and $A_6$ are as defined and preferred above.

Preferred dyes of the formula (2) are those in which $R_3$, $R_4$, $R_5$ and $R_6$ are hydrogen or $C_1$–$C_4$alkyl, in particular hydrogen, $B_2$ is a bridge member of the formulae (5a) to (5h), in particular a bridge member of the formulae (5a) to (5c), and $A_3$, $A_4$, $A_5$ and $A_6$ are radicals of the formulae (6) to (15), in particular those of the formulae (6), (7), (8), (9), (10), (11), (12) and (14), preferably those of the formulae (6), (7), (9), (11), (12) and (14).

Radicals $A_3$, $A_4$, $A_5$ and $A_6$ of the formula (6) or (7) are of particular interest here.

Preferably, $A_3$ and $A_5$, and $A_4$ and $A_6$ in each case have identical meanings. Dyes which are of particular importance are those of the formula (2) in which $A_3$, $A_4$, $A_5$ and $A_6$ have identical meanings.

Particularly preferred dyes of the formula (2) are those in which $R_3$, $R_4$, $R_5$ and $R_6$ are hydrogen, $B_2$ is a bridge member of the formulae (5a) to (5c) and $A_3$, $A_4$, $A_5$ and $A_6$ are radicals of the formulae (6), (7), (8), (9), (10), (11), (12), and (14), in particular those of the formulae (6), (7), (9), (11), (12) and (14), preferably those of the formula (6) or (7), and in which $A_3$ and $A_5$, and $A_4$ and $A_6$ preferably in each case have identical meanings, and in particular in which $A_3$, $A_4$, $A_5$ and $A_6$ have identical meanings.

Another group of interesting dyes of the formula (2) is formed by the dyes of the formula (2a) in which $R_1$, $R_2$, $A_1$, $A_2$ and $X_1$ are as defined and preferred under formula (2a).

The present invention furthermore relates to processes for the preparation of the dyes of the formulae (1) and (2).

The process for the preparation of anionic acid dyes of the formula (1) in which n is the number 0 comprises reacting a compound of the formula

 (18)

with a compound of the formula

 (19a), $A_1$-$NHR_1$      (19a), a compound of the formula

$A_2$-$NHR_2$      (19b)

and a compound of the formula

$Y_1$-H      (20a)

in which $A_1$, $A_2$, $R_1$, $R_2$ and $Y_1$ are each as defined under formula (1) and Z is halogen, preferably chlorine.

Preferably, the trihalogenotriazine compound of the formula (18) is first reacted with approximately stoichiometric amounts of an aminoazo compound of the formula (19a) at a temperature of −5° to 20° C., preferably 0° to 5° C., the pH being kept neutral to acid, preferably at 2 to 7, in particular 2 to 4, by addition of suitable bases, for example alkali metal bases, such as lithium hydroxide or carbonate, sodium hydroxide or carbonate or potassium hydroxide or carbonate. Approximately stoichiometric amounts of an aminoazo compound of the formula (19b) are advantageously added to the resulting reaction mixture and this is reacted with the triazine derivative at slightly elevated temperature, preferably at 30° to 60° C., and at a neutral to slightly acid pH, which is preferably 6 to 7. If the compounds of the formulae (19a) and (19b) are identical aminoazo compounds, about 2 equivalents of this aminoazo dye are reacted with one equivalent of triazine compound, the temperature preferably first being kept at −5° to 20° C. and then being increased to about 30° to 60° C.

Another possibility comprises reacting the triazine compound of the formula (18) with a mixture comprising both a compound of the formula (19a) and a compound of the formula (19b) which differs from this, a mixture which comprises an asymmetric compound of the formula

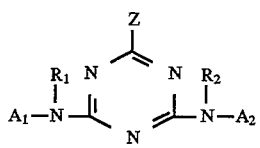

and two symmetric compounds of the formulae

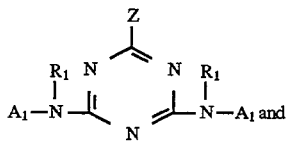

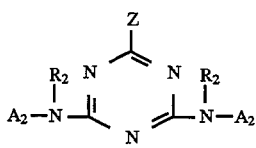

being obtained.

The triazinyl dyes obtainable according to the processes described above still contain a halogen atom Z, which can be converted into a group $Y_1$ by reaction with a compound of the formula (20a) at elevated temperature, preferably 70° to 100° C., and at a neutral to slightly alkaline pH, which is, for example, 7 to 9, depending on the compound of the formula (20a) employed.

The compounds of the formula (1) defined above in which n is the number 1 are prepared, for example, by a) reacting, independently of one another, a compound of the formula

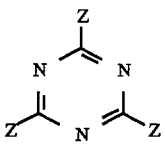 (18)

with a compound of the formula $A_1$-$NHR_1$ (19a)

to give the compound of the formula

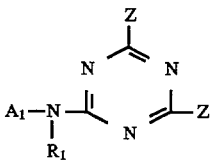 (21a)

and reacting a further compound of the formula (18) with a compound of the formula $A_2$-$NHR_2$ (19b)

to give the compound of the formula

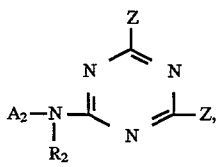 (21b)

b) reacting a compound of the formula

H-$B_1$-H (22a)

in succession, in any sequence, with the compounds of the formula (21a) and (21b) obtainable according to a) and c) reacting the compound obtainable according to b) of the formula

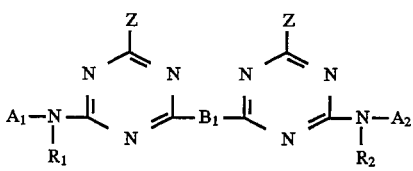 (23)

with at least one of the compounds of the formulae $Y_1$-H (20a) and $Y_2$-H (20b)

in which $A_1$, $A_2$, $R_1$, $R_2$, $Y_1$, $Y_2$ and $B_1$ are each as defined under formula (1) and Z is halogen, preferably chlorine.

The reaction of the compound of the formula (18) with the compound of the formula (19a) and (19b) according to step a) is advantageously carried out here as described above.

The reaction of the compound of the formula (22a) with the compounds of the formula (21a) and (21b) obtained according to a) is preferably carried out at a slightly elevated temperature, advantageously, for example, at 30° to 50° C., and at a neutral to slightly acid pH, which is, for example, 6 to 7, approximately stoichiometric amounts of the compounds (21a), (21b) and (22a) being employed. If the compounds of the formula (19a) and (19b) are identical aminoazo compounds, 2 molar equivalents of the compound of the formula (21a) are advantageously first prepared and these are reacted with about 1 molar equivalent of a compound of the formula (22a). The compounds of the formula (23) obtainable according to b) still contain 2 halogen atoms Z, which can advantageously be converted into a group $Y_1$ or $Y_2$ as described above.

The process for the preparation of anionic acid dyes of the formula (2) comprises a) reacting a compound of the formula

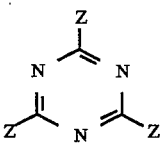 (18)

with a compound of the formula $A_3$-$NHR_3$ (19c)

and a compound of the formula

A₄-NHR₄ (19d)

to give the compound of the formula $$\begin{array}{c} Z \\ \| \\ N \diagup \diagdown N \\ A_3{-}N{-}\|\phantom{xx}\|{-}N{-}A_4 \\ | \quad N \quad | \\ R_3 \phantom{xxxx} R_4 \end{array}$$ (24a)

b) reacting a compound of the formula $$\begin{array}{c} Z \\ \| \\ N \diagup \diagdown N \\ Z\diagdown\phantom{x}\diagup N \diagdown\phantom{x}\diagup Z \end{array}$$ (18)

with a compound of the formula

A₅-NHR₅ (19e)

and a compound of the formula

A₆-NHR₆ (19f)

to give the compound of the formula $$\begin{array}{c} Z \\ \| \\ N \diagup \diagdown N \\ A_5{-}N{-}\|\phantom{xx}\|{-}N{-}A_6 \\ | \quad N \quad | \\ R_5 \phantom{xxxx} R_6 \end{array}$$ (24b)

and c) reacting a compound of the formula

H-B₂-H (22b)

with the compounds of the formula (24a) and (24b) obtainable according to a) and b), in which
A₃, A₄, A₅, A₆, R₃, R₄, R₅, R₆ and B₂ are each as defined under formula (2) and Z is halogen, preferably chlorine.

The reaction of the compound of the formula (18) with the compound of the formula (19c) and (19d) according to step a) and the reaction of the compound of the formula (18) with the compound of the formula (19e) and (19f) according to step b) is advantageously carried out here as described above.

The reaction of the compounds of the formulae (24a) and (24b) with the compound of the formula (22b) according to c) is preferably carded out at an elevated temperature, advantageously, for example, at 50° to 100° C., and at a neutral to slightly alkaline pH, which is, for example, 7 to 11, approximately stoichiometric amounts of the compounds (24a), (24b) and (22b) advantageously being employed. If the compounds of the formula (24a) and (24b) are identical aminoazo compounds, 2 molar equivalents of the compound of the formula (24a) are advantageously first prepared and these are reacted with about 1 molar equivalent of the compound of the formula (22b).

The present invention furthermore relates to a process for the preparation of dye mixtures which comprise an anionic acid dye of the formula (1a) together with an anionic acid dye of the formula (2a). This process comprises reacting a compound of the formula $$\begin{array}{c} Z \\ \| \\ N \diagup \diagdown N \\ R_1{-}N{-}\|\phantom{xx}\|{-}N{-}R_2 \\ | \quad N \quad | \\ A_1 \phantom{xxxx} A_2 \end{array}$$ (16)

with a compound of the formula

H-X₁-H (17)

the compounds of the formulae (16) and (17) being in a molar ratio which is greater than
1:1 and less than 2:1, and in which
Z is halogen, in particular chlorine, and
R₁, R₂, A₁, A₂ and X₁ are as defined under the formulae (1a) and (2a).

The compound of the formula (16) can advantageously be obtained as described above.

The reaction of the compound of the formula (16) with the compound of the formula (17) is carried out, for example, at an elevated temperature, preferably 70° to 100° C., and at an alkaline pH, which is, for example, 9 to 12, depending on the compound of the formula (17) employed. The compounds of the formulae (16) and (17) are employed here in a molar ratio which is greater than 1:1 and less than 2:1. The compounds of the formulae (16) and (17) are preferably employed here in a molar ratio of 9:8 to 15:8, in particular in a molar ratio of 10:8 to 14:8. In contrast to the process for the preparation of the compounds of the formula (1) in which n is the number 0, a pH which is more in the alkaline range furthermore is used in the process for the preparation of the dye mixtures of the compounds of the formulae (1a) and (2a).

The radicals R₁, R₂, R₃, R₄, R₅, R₆, B₁, B₂, A₁, A₂, A₃, A₄, A₅, A₆, Y₁ and Y₂ of compounds employed in the above processes are as defined and preferred above.

The compounds employed in the above processes are known or can be obtained analogously to known compounds.

The compounds of the formulae (19a) to (19f) can be obtained in a known manner by diazotization and coupling of corresponding starting compounds, the diazotization being carded out in a manner known per se, for example with a nitrite, for example with an alkali metal nitrite, such as sodium nitrite, in a mineral acid medium, for example in a hydrochloric acid medium, at temperatures of, for example, −5° to 40° C., and preferably at −5° to 10° C. The coupling is carded out in a manner known per se at acid, neutral to weakly alkaline pH values and at temperatures of, for example, 0° to 30° C.

If the compounds of the formulae (19a) to (19f) are metal complex azo compounds, these can be obtained from the corresponding azo compounds by customary metallization reactions.

The dye mixtures according to the invention of the anionic acid dyes of the formulae (1) and (2) can also be prepared, for example, by mixing the individual dyes. This mixing process is carded out, for example, in suitable mills, for example bead and pinned disc mills, as well as in kneaders or mixers.

The dye mixtures furthermore can be prepared, for example, by spray drying the aqueous dye mixtures.

The dye mixtures preferably comprise 5 to 95% by weight, in particular 10 to 90% by weight, and preferably 20 to 80% by weight, of a dye of the formula (1), based on the total amount of dyes in the mixture.

The anionic acid dyes of the formulae (1) and (2) are present either in the form of their free acid or, preferably, as salts thereof.

Salts are, for example, the alkali metal, alkaline earth metal or ammonium salts or the salts of an organic amine. Examples are the sodium, lithium, potassium or ammonium salts or the salt of mono-, di- or triethanolamine.

The term sulfo generally includes the free acid form (—SO$_3$H) as well as the salt form.

The dyes of the formulae (1) and (2) are anionic acid dyes. In these, the number of anionic groups, in particular the number of sulfo groups, is greater than the number of cationic groups. Cationic groups are to be understood as meaning those which carry a cationic charge under the customary dyeing conditions. Examples are aliphatically bonded amino radicals. The nitrogen atoms present in the triazine ring and those bonded to the triazine radical carry no cationic charge.

The invention furthermore relates to the use of the anionic acid dyes of the formulae (1) and (2) and mixtures thereof for dyeing or printing fibre materials containing nitrogen groups and, in particular, fibre materials containing hydroxyl groups.

The anionic acid dyes of the formulae (1) and (2) according to the invention and mixtures thereof are therefore suitable for dyeing and printing nitrogen-containing or, in particular, cellulosic fibre materials, preferably textile fibre materials, of silk, wool or synthetic polyamides, and preferably of cellulosic fibres, such as rayon, cotton or hemp. Paper and leather may also be mentioned.

As regards their dyeing properties, they can be described as directly absorbing or direct dyes (C.I. direct dyes).

Textile fibre materials comprising blends, for example of wool/cotton, polyamide/cotton, polyacrylic/cotton or, in particular, polyester/cotton blends, can likewise be dyed by one-bath dyeing processes and in the presence of dyes for the other respective fibre types.

The textile fibre materials can be in widely varying states of processing, for example as fibres, yarn, woven fabric or knitted fabric.

Level dyeings having good all-round properties, in particular good fastnesses to rubbing, wet processing, wet rubbing, perspiration and light, are obtained. If necessary, the wet fastness properties, in particular the fastness to washing, of the resulting direct dyeings and prints can be further improved substantially by an after-treatment with so-called fixing agents.

The anionic acid dyes of the formulae (1) and (2) according to the invention and mixtures thereof can easily be combined with other dyes, in particular disperse dyes. The anionic acid dyes of the formulae (1) and (2) according to the invention and mixtures thereof have an adequate high temperature stability and can thus be used for dyeing under the dyeing conditions for polyester fibres, i.e. at temperatures in the range from about 100° to 150° C., preferably from 110° to 130° C., from an aqueous liquor and at a pH of 4 to 7.5, preferably 5 to 7.

It is thus possible to employ customary disperse dyes together with the anionic acid dyes of the formulae (1) and (2) according to the invention and mixtures thereof in a one-stage, one-bath process for dyeing polyester/cotton blends (blend fabrics), both types of fibre being dyed in a level and fast manner by the particular dye. If a disperse dye with the same shade as the anionic acid dyes of the formulae (1) and (2) according to the invention and mixtures thereof is used, it is also possible to obtain solid dyeings.

By providing the anionic acid dyes of the formulae (1) and (2) according to the invention and mixtures thereof, dyeing of textile blends (blend fabrics), for example those of polyester fibres and cellulose fibres, can be simplified substantially. The dyeing, which is customary per se, of each type of fibre of a fibre mixture in a separate working operation using different dyeing conditions is therefore no longer necessary.

The following examples serve to illustrate the invention. Parts and percentages relate to the weight, unless stated otherwise. Parts by weight and parts by volume bear the same relationship to one another as the kilogram to the liter. Temperatures are in degrees Celsius.

EXAMPLE 1 a) 20.3 parts of cyanuric chloride, 100 parts of water and 100 parts of ice are ground in a mixer. The suspension thus obtained is diluted with 200 parts of water and initially introduced into the reaction vessel.

A solution of 670 parts of water and 46.4 parts of a compound which, in the form of the free acid, has the formula

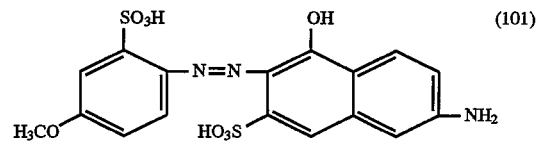

is then added dropwise at a temperature of 0° to 5° C., in the course of 1.5 hours, to the cyanuric chloride suspension obtained as described above. During this operation, the pH is kept at a value of 2.5 to 3 by addition of a 2 normal aqueous sodium hydroxide solution. The mixture is then allowed to react completely for one hour. The solution thus obtained contains the compound, shown in the form of the free acid, of the formula

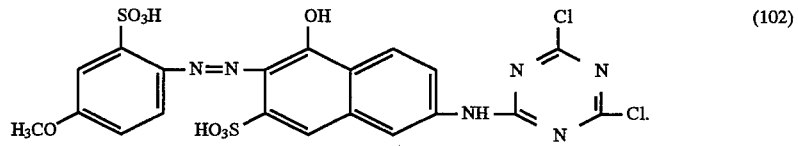

The compound of the formula (102) can be isolated by salting out, or advantageously employed directly as a solution for a further condensation reaction.

b) A solution of 570 parts of water and 46.4 parts of the compound of the formula (101) is added to the solution, obtainable as described above under a), of the compound of the formula (102) and the pH is brought to a value of 6.5. The temperature is then increased to 40° to 50° C., the pH being kept at a value of 6.5 by addition of a 2 normal aqueous sodium hydroxide solution. After about 13 hours, the condensation reaction has ended. The solution thus obtained contains the compound shown in the form of the free acid, of the formula

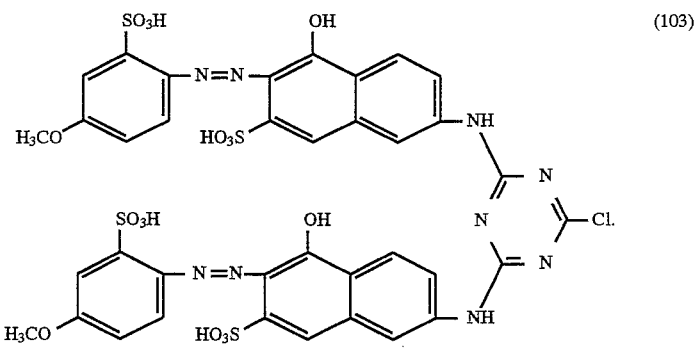
(103)

The compound of the formula (103) can be isolated by salting out by means of sodium chloride/potassium chloride, or employed directly as a solution for a further condensation reaction.

c) 200 parts of water are added to 14.71 parts of the compound of the formula (103) with a content of 69.2% which is previously separated off by salting out from the solution obtainable as described above under b), and the mixture is heated to a temperature of 85° C.

A solution of 30 parts of water and 1.53 parts of 1,3-diaminopropane, brought to a pH of 8.5 by addition of 2 normal hydrochloric acid, is then added to the solution, prepared as above under c), of the compound of the formula (103). The mixture is heated at a temperature of 85° C. for 4 hours and the pH is kept at a value of 8.5 by addition of a 2 normal aqueous sodium hydroxide solution. To separate off the product, 25 parts of sodium chloride are sprinkled in and the pH is simultaneously brought stepwise to a value of 7 by addition of acetic acid. The mixture is then allowed to cool to a temperature of 30° C. and the dye which has precipitated out is filtered off with suction. After drying, a dye which, in the form of the free acid, is the compound of formula A solution, brought to a pH of 5, of 3000 parts of water and 91 parts of a compound which, in the form of the free acid, has the formula

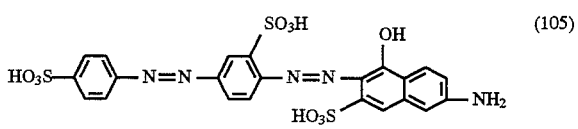
(105)

is then added at a temperature of 0° to 5° C., in the course of one hour, to the cyanuric chloride suspension obtained as described above. During this operation, the pH is kept at a value of 2 by addition of a 2 normal aqueous sodium hydroxide solution. The pH is then brought to a value of 5 and the mixture is allowed to react completely at the pH of 5 and at room temperature for about 4 hours. The solution thus obtained contains the compound, shown in the form of the free acid, of the formula

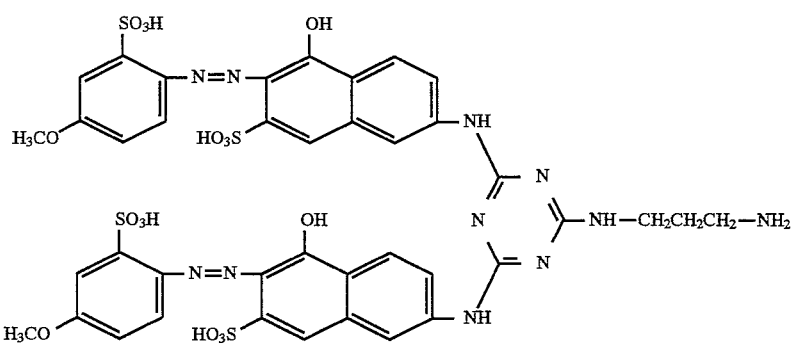
(104)

is obtained. The dye of the formula (104) dyes cotton in red colour shades.

EXAMPLE 2 a) 27.7 parts of cyanuric chloride, 100 parts of water and 100 parts of ice are ground in a mixer. The suspension thus obtained is initially introduced into the reaction vessel.

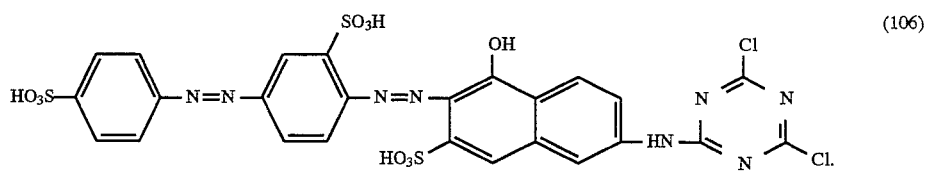
(106)

b) A solution is prepared which contains 2000 parts of water and 91 parts of the compound, shown in the form of the free acid, of the formula

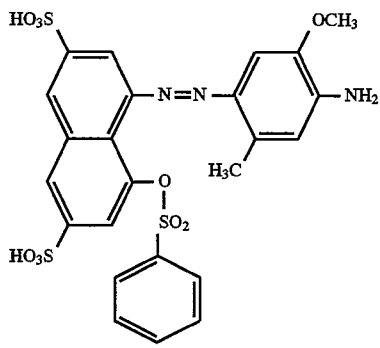
(107)

and is brought to a pH of 6.

This solution of the compound of the formula (107) is added dropwise at room temperature, in the course of one hour, to the solution, obtainable as described above under a), of the compound of the formula (106), the pH being kept at a value of 5.7 by addition of a 2 normal aqueous sodium carbonate solution. The temperature is then increased to 52° to 55° C. and the pH is further kept at a value of 5.7. The mixture is allowed to react completely for 20 hours. It is then cooled to a temperature of 50° C. and the product is salted out with 500 pans of sodium chloride, and 1200 parts of ethanol are added dropwise to bring the separation to completion. The mixture is stirred thoroughly for a further 2 hours and the product which has precipitated out is filtered off with suction. After drying, a compound which, in the form of the free acid, has the formula c) 180 parts of water are added to 13.13 parts of the compound of the formula (108) obtainable as described under b), with a content of 75.7 %. This solution is brought to a pH of 6 and heated to a temperature of 85° C.

A solution of 20 parts of water and 1.46 parts of 1-(2-aminoethyl)-piperazine, which is brought to a pH of 6.5 by addition of concentrated hydrochloric acid, is then added to the solution, prepared as above under c), of the compound of the formula (108). The mixture is heated at a temperature of 85° C. for 15 hours and the pH is kept at a value of 6.5 by addition of a 1 normal aqueous sodium hydroxide solution. The reaction solution thus obtained contains the compound, shown in the form of the free acid, of the formula

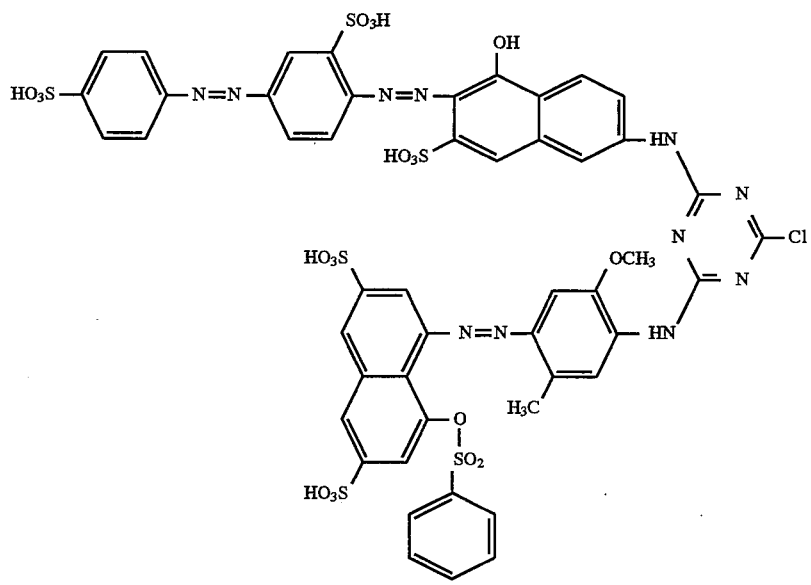
(108)

is obtained.

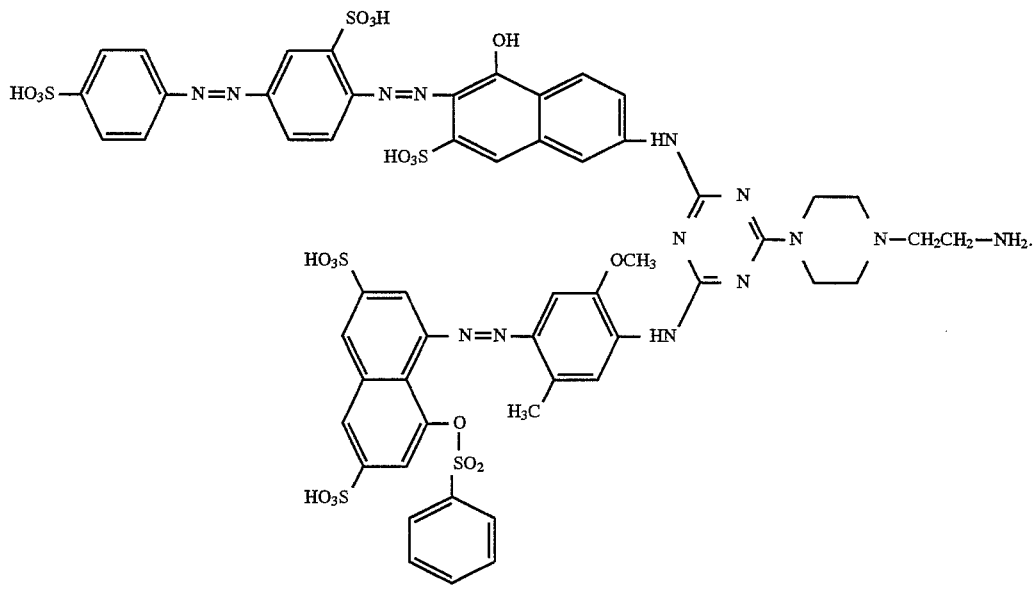

(109)

d) To split off the sulfonic acid ester of the compound of the formula (109), 11 parts of an aqueous sodium hydroxide solution (30% strength) are added at a temperature of 85° C. to the solution, obtainable as described above under c), of the compound of the formula (109) and the mixture is allowed to react for about 2 to 3 hours. It is then brought to a pH of 9 with a 2 normal aqueous hydrochloric acid solution and the product which has precipitated out is filtered off and dried. A dye which, in the form of the free acid, is the compound of the formula

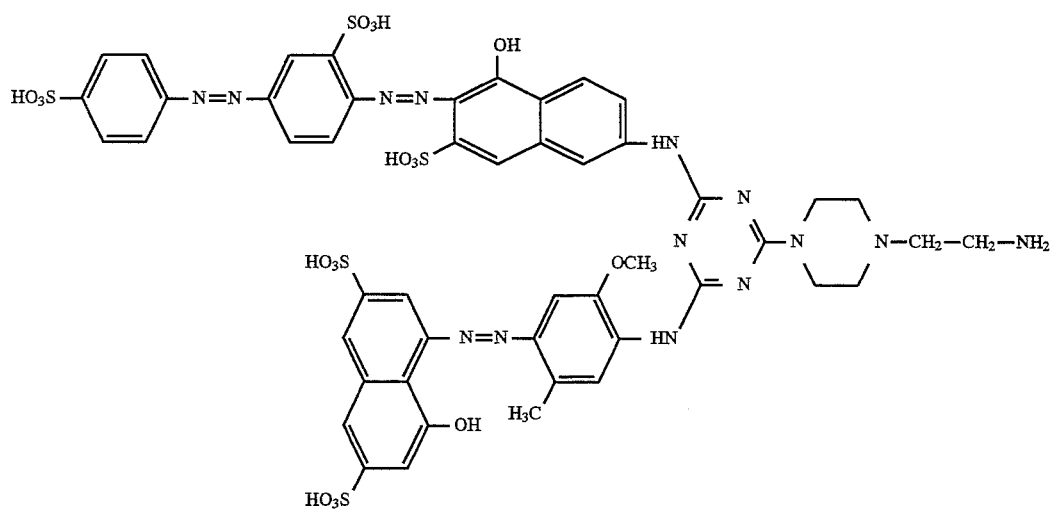

(110)

is obtained. The dye of the formula (110) dyes cotton in red shades.

Radicals $A_1$ and $A_2$ listed in the following tables are identified by the symbols A to Z6 and have the following meanings there:

-continued

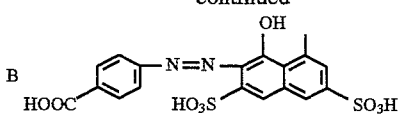

B

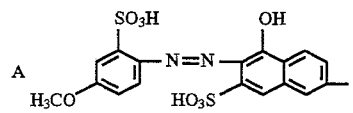

A

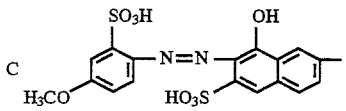

C

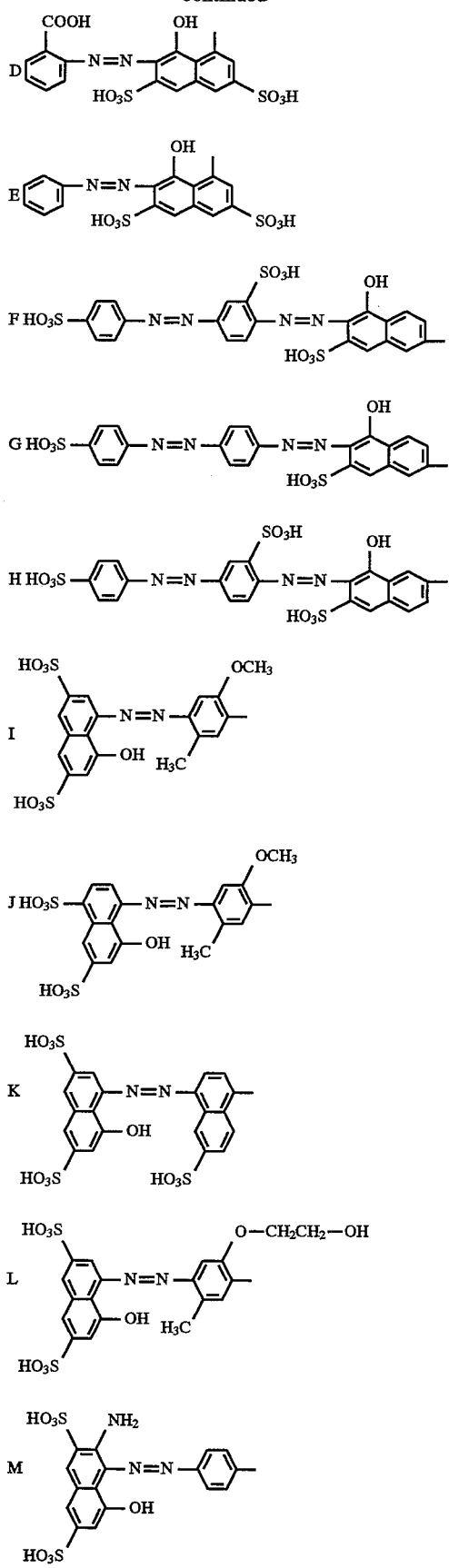
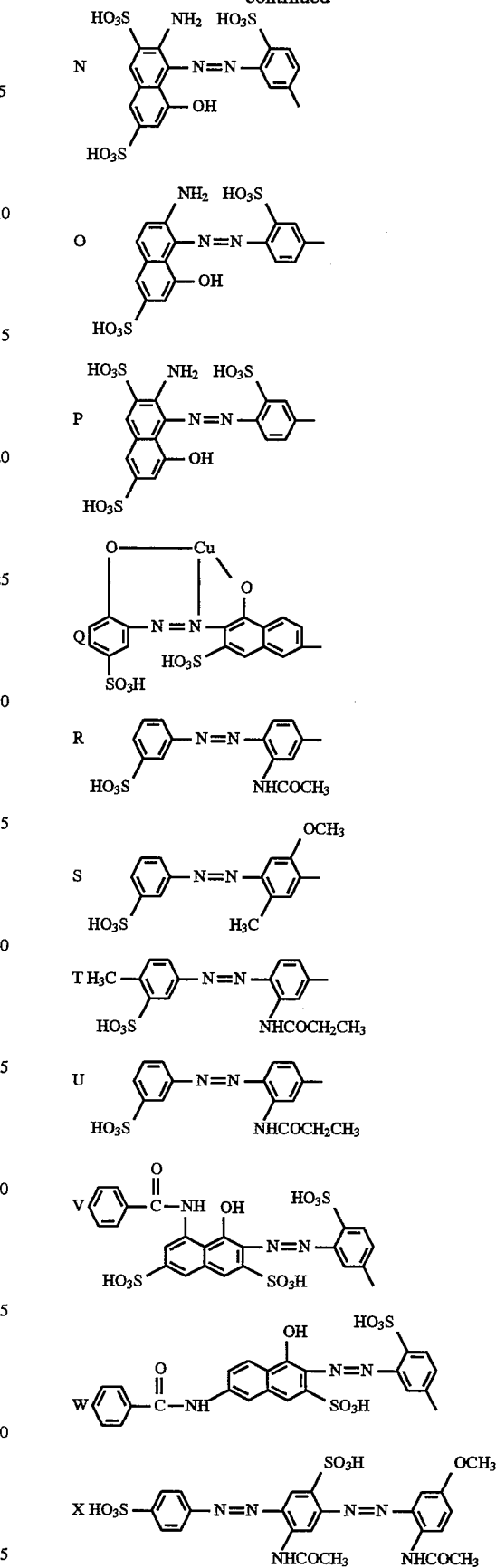

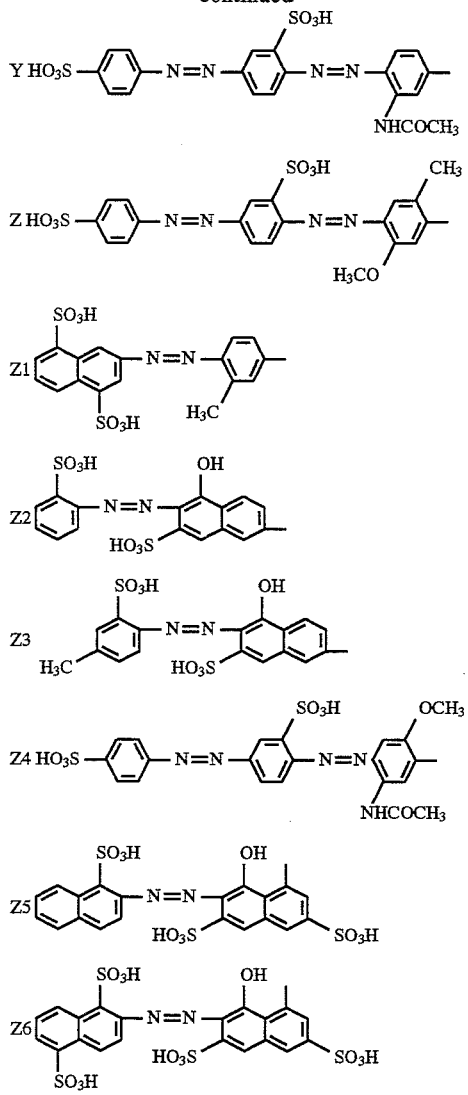

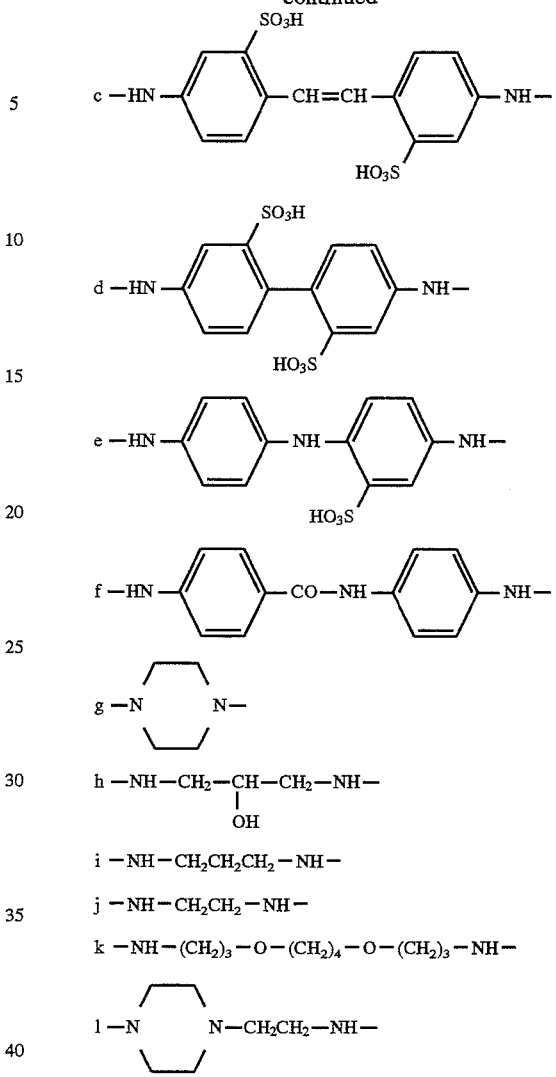

Bridge members $B_1$ listed in the following tables are identified by the symbols a to l and have the following meanings there:

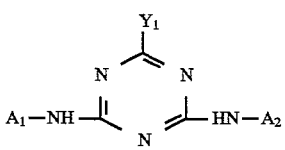

EXAMPLES 3 to 104: Dyes of the general formula $$A_1-NH-\underset{N}{\overset{\underset{Y_1}{N}\diagdown\diagup N}{\parallel}}-HN-A_2$$

in which $A_1$, $A_2$ and $Y_1$ are as defined in the following Table 1, can be obtained in an analogous manner to Examples 1 and 2. The dyes shown in the form of the free acid in Table 1 dye cotton in the colour shades stated in column 5 of the table.

The symbols A to Z6 for the radicals A1 and $A_2$ are as defined above.

TABLE 1

| Example | $A_1$ | $A_2$ | $Y_1$ | Shade on cotton |
|---|---|---|---|---|
| 3 | A | A | —NH—CH$_2$CH$_2$—NH$_2$ | scarlet |
| 4 | A | A | —NH—CH$_2$—CH(OH)—CH$_2$—NH$_2$ | scarlet |
| 5 | A | A | —NH—CH$_2$CH$_2$CH$_2$—N(CH$_3$)$_2$ | scarlet |
| 6 | A | A | —NH—CH$_2$CH$_2$—N(H)(CH$_2$CH$_2$OH) | scarlet |
| 7 | A | A | —NH—CH$_2$CH$_2$CH$_2$—N(H)(CH$_3$) | scarlet |
| 8 | A | A | —NH—CH$_2$—CH(CH$_3$)—NH$_2$ | scarlet |
| 9 | A | A | —N(piperazine)N—CH$_2$CH$_2$OH | scarlet |
| 10 | A | A | —N(piperazine)N—CH$_2$CH$_2$NH$_2$ | scarlet |
| 11 | A | A | —N(piperazine)N—CH$_3$ | scarlet |
| 12 | A | F | —NH—CH$_2$CH$_2$CH$_2$—NH$_2$ | red |
| 13 | A | F | —N(piperazine)N—CH$_3$ | red |
| 14 | A | F | —NH—CH$_2$—CH(OH)—CH$_2$—NH$_2$ | red |
| 15 | A | F | —NH—CH$_2$CH$_2$—N(C$_2$H$_5$)$_2$ | red |
| 16 | F | F | —NH—CH$_2$CH$_2$CH$_2$—NH$_2$ | bluish-tinged red |
| 17 | F | F | —N(piperazine)N—CH$_2$CH$_2$NH$_2$ | bluish-tinged red |
| 18 | F | I | —N(piperazine)N—CH$_2$CH$_2$NH$_2$ | bluish-tinged red |
| 19 | F | I | —N(piperazine)N—CH$_2$CH$_2$OH | bluish-tinged red |

TABLE 1-continued

| Example | A₁ | A₂ | Y₁ | Shade on cotton |
|---|---|---|---|---|
| 20 | F | I | —NH—CH₂CH₂CH₂—NH₂ | bluish-tinged red |
| 21 | F | I | —NH—CH₂CH₂CH₂—N(H)(CH₃) | bluish-tinged red |
| 22 | F | I | —NH—CH₂CH₂CH₂—N(CH₃)₂ | bluish-tinged red |
| 23 | F | I | —NH—CH₂CH₂—N(morpholino) | bluish-tinged red |
| 24 | F | I | —NH—CH₂—CH(CH₃)—NH₂ | bluish-tinged red |
| 25 | F | I | —NH—(CH₂)₅—NH₂ | bluish-tinged red |
| 26 | F | I | —N(piperazino)N—CH₃ | bluish-tinged red |
| 27 | F | I | —NH—CH₂CH₂—N(H)(CH₂CH₂OH) | bluish-tinged red |
| 28 | I | I | —NH—CH₂CH₂CH₂—NH₂ | orange |
| 29 | I | I | —N(piperazino)N—CH₃ | orange |
| 30 | I | A | —NH—CH₂CH₂CH₂—NH₂ | scarlet |
| 31 | I | A | —N(piperazino)N—CH₃ | scarlet |
| 32 | I | A | —NH—CH₂CH₂—N(C₂H₅)₂ | scarlet |
| 33 | B | A | —NH—CH₂CH₂—N(C₂H₅)₂ | red |
| 34 | B | A | —N(piperazino)N—CH₂CH₂OH | red |
| 35 | M | M | —NH—CH₂CH₂CH₂—NH₂ | pink |
| 36 | M | M | —N(piperazino)N—CH₃ | pink |
| 37 | M | G | —NH—CH₂CH₂CH₂—NH₂ | pink |

TABLE 1-continued

| Example | A₁ | A₂ | Y₁ | Shade on cotton |
|---|---|---|---|---|
| 38 | M | G | —N(piperazine)N—CH₃ | pink |
| 39 | M | F | —NH—CH₂CH₂CH₂—NH₂ | bluish-tinged red |
| 40 | M | F | —N(piperazine)N—CH₃ | bluish-tinged red |
| 41 | M | H | —NH—CH₂CH₂CH₂—NH₂ | bluish-tinged red |
| 42 | Q | H | —NH—CH₂CH₂CH₂—NH₂ | claret-brown |
| 43 | Q | H | —N(piperazine)N—CH₃ | claret-brown |
| 44 | Q | G | —NH—CH₂CH₂CH₂—NH₂ | claret |
| 45 | Q | G | —NH—CH₂CH₂—N(morpholine)O | claret |
| 46 | Q | F | —NH—CH₂CH₂—N(morpholine)O | claret |
| 47 | Q | F | —NH—CH₂CH₂CH₂—NH₂ | claret |
| 48 | Q | N | —NH—CH₂CH₂CH₂—NH₂ | claret |
| 49 | N | N | —N(piperazine)N—CH₃ | bluish-tinged red |
| 50 | Q | V | —N(piperazine)N—CH₃ | claret |
| 51 | Q | V | —NH—(CH₂)₄—NH₂ | claret |
| 52 | Q | V | —NH—CH₂—C(CH₃)₂—CH₂—NH₂ | claret |
| 53 | Q | Q | —NH—CH₂CH₂CH₂—NH₂ | claret |
| 54 | Q | Q | —N(piperazine)N—CH₃ | claret |
| 55 | Q | Q | —NH—CH₂CH₂—N(morpholine)O | claret |
| 56 | I | Q | —N(piperazine)N—CH₃ | brown-claret |
| 57 | C | Q | —NH—CH₂CH₂CH₂—NH₂ | scarlet-orange |

TABLE 1-continued

| Example | A₁ | A₂ | Y₁ | Shade on cotton |
|---|---|---|---|---|
| 58 | R | Q | —NH—CH₂—CH(CH₃)—NH₂ | brown |
| 59 | D | V | —NH—CH₂CH₂CH₂—NH₂ | pink |
| 60 | D | V | —N(piperazine)N—CH₂CH₂NH₂ | pink |
| 61 | D | P | —N(piperazine)N—CH₂CH₂NH₂ | red-violet |
| 62 | D | P | —NH—CH₂CH₂CH₂—NH₂ | red-violet |
| 63 | D | S | —N(piperazine)N—CH₃ | brown-orange |
| 64 | X | E | —NH—CH₂—C(CH₃)(CH₃)—CH₂—NH₂ | brown-red |
| 65 | X | X | —NH—CH₂CH₂CH₂—NH₂ | brown-red |
| 66 | X | Q | —NH—(CH₂)₆—NH₂ | brown-claret |
| 67 | X | F | —NH—(CH₂)₄—NH₂ | brown |
| 68 | X | K | —NH—CH₂CH₂CH₂—NH₂ | brown |
| 69 | X | M | —N(piperazine)N—CH₃ | brown |
| 70 | X | T | —NH—CH₂CH₂CH₂—NH₂ | brown-orange |
| 71 | O | T | —NH—CH₂CH₂CH₂—NH₂ | orange |
| 72 | W | T | —NH—CH₂CH₂CH₂—NH₂ | orange |
| 73 | J | T | —NH—CH₂CH₂CH₂—NH₂ | orange |
| 74 | F | T | —NH—CH₂CH₂CH₂—NH₂ | orange |
| 75 | I | Y | —NH—CH₂CH₂CH₂—NH₂ | orange |
| 76 | L | P | —NH—CH₂—CH(OH)—CH₂—NH₂ | red |
| 77 | L | P | —N(piperazine)N—CH₂CH₂OH | red |
| 78 | L | P | —NH—CH₂CH₂—N(H)(CH₂CH₂OH) | red |
| 79 | L | O | —NH—CH₂CH₂CH₂—NH₂ | red |
| 80 | L | O | —N(piperazine)N—CH₃ | red |
| 81 | V | M | —NH—CH₂CH₂CH₂—NH₂ | pink |
| 82 | V | V | —NH—CH₂CH₂CH₂—NH₂ | red |

TABLE 1-continued

| Example | A₁ | A₂ | Y₁ | Shade on cotton |
|---|---|---|---|---|
| 83 | V | V | —N(CH₂CH₂)₂N—CH₃ (piperazine) | red |
| 84 | V | V | —N(CH₂CH₂)₂N—CH₂CH₂NH₂ (piperazine) | red |
| 85 | V | I | —NH—CH₂CH₂CH₂—NH₂ | bluish-tinged red |
| 86 | V | Z | —NH—CH₂CH₂CH₂—NH₂ | orange-red |
| 87 | V | F | —NH—CH₂CH₂CH₂—NH₂ | bluish-tinged red |
| 88 | V | F | —N(CH₂CH₂)₂N—CH₃ (piperazine) | bluish-tinged red |
| 89 | V | F | —NH—CH₂CH₂CH₂—N(CH₃)₂ | bluish-tinged red |
| 90 | Z2 | Z2 | —NH—CH₂CH₂CH₂—NH₂ | scarlet |
| 91 | Z2 | Z2 | —NH—CH₂—CH(OH)—CH₂—NH₂ | scarlet |
| 92 | Z2 | Z2 | —NH—CH₂CH₂CH₂—N(CH₃)₂ | scarlet |
| 93 | Z2 | Z2 | —NH—CH₂CH₂—N(H)(CH₂CH₂OH) | scarlet |
| 94 | Z2 | Z2 | —NH—CH₂CH₂CH₂—N(H)(CH₃) | scarlet |
| 95 | Z2 | Z2 | —NH—CH₂—CH(CH₃)—NH₂ | scarlet |
| 96 | Z2 | Z2 | —N(CH₂CH₂)₂N—CH₂CH₂OH (piperazine) | scarlet |
| 97 | Z2 | Z2 | —N(CH₂CH₂)₂N—CH₂CH₂NH₂ (piperazine) | scarlet |
| 98 | Z2 | Z2 | —N(CH₂CH₂)₂N—CH₃ (piperazine) | scarlet |
| 99 | Z5 | Z5 | —NH—CH₂CH₂CH₂—NH₂ | bluish-tinged red |
| 100 | Z5 | Z5 | —N(CH₂CH₂)₂N—CH₃ (piperazine) | bluish-tinged red |

TABLE 1-continued

| Example | A₁ | A₂ | Y₁ | Shade on cotton |
|---------|----|----|----|-----------------|
| 101 | Z5 | Z5 | —N(CH₂CH₂)N—CH₂CH₂NH₂ (piperazine) | bluish-tinged red |
| 102 | Z4 | Z4 | —NH—CH₂CH₂CH₂—NH₂ | brown |
| 103 | Z4 | Z4 | —N(CH₂CH₂)N—CH₃ (piperazine) | brown |
| 104 | Z4 | Z4 | —NH—CH₂—CH(OH)—CH₂—NH₂ | brown |

EXAMPLE 105:

a) 20.3 parts of cyanuric chloride, 100 parts of water and 100 parts of ice are ground in a mixer. The suspension thus obtained is diluted with 200 parts of water and initially introduced into the reaction vessel.

A solution of 670 parts of water and 46.4 parts of a compound which, in the form of the free acid, has the formula

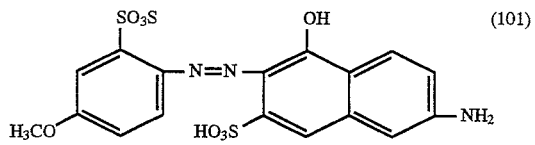
(101)

is then added dropwise at a temperature of 0° to 5° C., in the course of 1.5 hours, to the cyanuric chloride suspension obtained as described above. During this operation, the pH is kept at a value of 2.5 to 3 by addition of a 2 normal aqueous sodium hydroxide solution. The mixture is then allowed to react completely for one hour. The solution thus obtained contains the compound, shown in the form of the free acid, of the formula

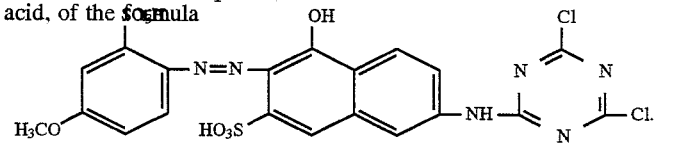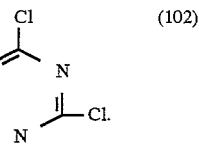
(102)

The compound of the formula (102) can be isolated by salting out, or advantageously employed directly as a solution for a further condensation reaction.

b) 5.4 parts of 1,4-diaminobenzene are added to the solution, obtainable as described above under a), of the compound of the formula (102) and the mixture is heated to a temperature of 40° C. The pH is kept at a value of 6.5 by addition of a 2 normal aqueous potassium bicarbonate solution and the mixture is allowed to react completely for about 18 to 20 hours. The solution thus obtained contains the compound, shown in the form of the free acid, of the formula

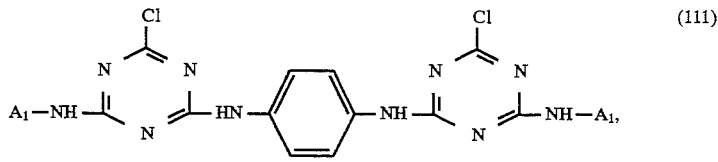
(111)

in which

A₁ is a radical of the formula

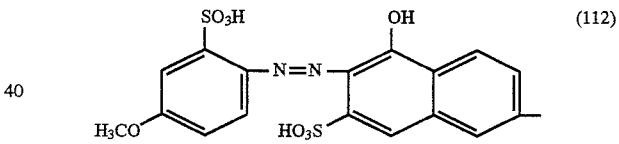
(112)

The compound of the formula (111) can be separated off by means of sodium chloride and by addition of ethanol, or advantageously employed directly as a solution for a further condensation reaction.

c) A solution of 150 parts of water and 22.2 parts of 1,3-diaminopropane, which has first been brought to a pH of 8.5 by addition of a 2 normal hydrochloric acid solution, is added to the solution, obtainable as described above under b), of the compound of the formula (111) and the mixture is then heated to a temperature of 80° C. During this operation, the pH is kept constant at a value of 8.5. The mixture is allowed to react completely for 20 hours, the pH is brought to a value of 7 and the product is salted out with an aqueous sodium chloride solution (10% strength). The resulting product is filtered off with suction and dried. A dye which, in the form of the free acid, has the formula

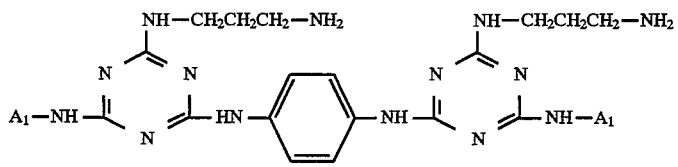

(113)

in which $A_1$ is the radical of the formula (112) defined above, is obtained. The dye of the formula (113) dyes cotton in red shades.

EXAMPLES 106 to 164: Dyes of the general formula

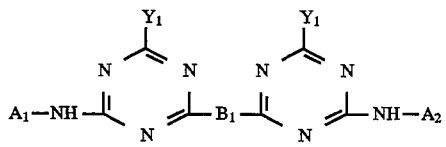

in which $A_1, A_2, B_1$ and $Y_1$ are as defined in the following Table 2, can be obtained in an analogous manner to Example 105. The dyes shown in the form of the free acid in Table 2 dye cotton in the shades stated in column 6 of Table 2.

The symbols A to Z6 for the radicals $A_1$ and $A_2$ and the symbols a to h for bridge member $B_1$ are as defined above.

TABLE 2

| Example | $A_1$ | $A_2$ | $B_1$ | $Y_1$ | Shade on cotton |
|---|---|---|---|---|---|
| 106 | A | A | b | —N͡N—CH₃ | scarlet |
| 107 | A | A | c | —N͡N—CH₂CH₂OH | scarlet |
| 108 | F | F | a | —N͡N—CH₂CH₂OH | bluish-tinged red |
| 109 | F | F | d | —N͡N—CH₂CH₂NH₂ | bluish-tinged red |
| 110 | I | I | e | —NH—CH₂CH₂—NH₂ | orange |
| 111 | B | B | a | —N͡N—CH₂CH₂NH₂ | pink |
| 112 | B | B | b | —N͡N—CH₂CH₂NH₂ | pink |
| 113 | M | M | c | —N͡N—CH₃ | pink |
| 114 | M | M | c | —NH—CH₂CH₂CH₂—NH₂ | pink |
| 115 | M | M | c | —NH—CH₂CH₂—N͡O | pink |
| 116 | Q | Q | c | —NH—(CH₂)₄—NH₂ | claret |
| 117 | N | N | f | —N͡N—CH₃ | pink |
| 118 | Q | Q | g | —NH—CH₂CH₂CH₂—NH₂ | claret |
| 119 | N | N | g | —N͡N—CH₃ | pink |
| 120 | Q | Q | h | —NH—CH₂CH₂—N(H)(CH₃) | claret |
| 121 | R | R | c | —NH—CH₂—CH(OH)—CH₂—NH₂ | lemon yellow |
| 122 | E | E | c | —NH—CH₂CH₂CH₂—NH₂ | pink |
| 123 | E | E | c | —N͡N—CH₃ | pink |
| 124 | E | E | c | —NH—CH₂CH₂—N͡O | pink |
| 125 | E | E | c | —N͡N—CH₂CH₂NH₂ | pink |
| 126 | X | X | a | —NH—CH₂CH₂CH₂—NH₂ | brown |
| 127 | X | X | b | —N͡N—CH₃ | brown |
| 128 | X | X | c | —N͡N—CH₃ | brown |

TABLE 2-continued

| Example | A₁ | A₂ | B₁ | Y₁ | Shade on cotton |
|---|---|---|---|---|---|
| 129 | V | V | c | −N(piperazinyl)N−CH₂CH₂NH₂ | red |
| 130 | V | V | c | −NH−CH₂CH₂CH₂−NH₂ | red |
| 131 | V | V | c | −N(piperazinyl)N−CH₃ | red |
| 132 | V | V | a | −N(piperazinyl)N−CH₃ | red |
| 133 | V | V | b | −N(piperazinyl)N−CH₃ | red |
| 134 | V | V | b | −NH−CH₂CH₂CH₂−NH₂ | red |
| 135 | Z2 | Z2 | a | −NH−CH₂CH₂CH₂−NH₂ | orange |
| 136 | F | F | b | −NH−CH₂CH₂CH₂−NH₂ | red |
| 137 | I | F | b | −N(piperazinyl)N−CH₂CH₂NH₂ | red |
| 138 | Z5 | Z5 | a | −N(piperazinyl)N−CH₂CH₂NH₂ | bluish-tinged red |
| 139 | Z1 | Z5 | a | −NH−CH₂−CH(OH)−CH₂−NH₂ | bluish-tinged red |
| 140 | Z5 | Z5 | a | −NH−CH₂CH₂CH₂−NH₂ | bluish-tinged red |
| 141 | Z5 | Z5 | a | −N(piperazinyl)N−CH₃ | bluish-tinged red |
| 142 | Z5 | Z5 | b | −NH−CH₂CH₂CH₂−NH₂ | bluish-tinged red |
| 143 | Z5 | Z5 | b | −N(piperazinyl)N−CH₃ | bluish-tinged red |
| 144 | Z5 | Z5 | b | −NH−CH₂CH₂CH₂−NH₂ | bluish-tinged red |
| 145 | Z5 | Z5 | b | −NH−CH₂−CH(OH)−CH₂−NH₂ | bluish-tinged red |
| 146 | Z5 | Z5 | g | −N(piperazinyl)N−CH₃ | bluish-tinged red |
| 147 | Z5 | Z5 | g | −NH−CH₂CH₂CH₂−NH₂ | bluish-tinged red |
| 148 | Z5 | Z5 | g | −N(piperazinyl)N−CH₂CH₂NH₂ | bluish-tinged red |
| 149 | Z5 | Z5 | g | −NH−CH₂−CH(OH)−CH₂−NH₂ | bluish-tinged red |
| 150 | Z6 | Z6 | a | −NH−CH₂CH₂CH₂−NH₂ | bluish-tinged red |
| 151 | Z6 | Z6 | b | −N(piperazinyl)N−CH₂CH₂NH₂ | bluish-tinged red |
| 152 | Z6 | Z6 | g | −N(piperazinyl)N−CH₂CH₂NH₂ | bluish-tinged red |
| 153 | Z6 | Z6 | g | −NH−CH₂CH₂CH₂−NH₂ | bluish-tinged red |
| 154 | X | X | a | −N(piperazinyl)N−CH₂CH₂NH₂ | brown |
| 155 | X | X | b | −N(piperazinyl)N−CH₂CH₂NH₂ | brown |
| 156 | X | X | g | −NH−CH₂CH₂CH₂−NH₂ | brown |
| 157 | X | X | g | −N(piperazinyl)N−CH₂CH₂NH₂ | brown |
| 158 | Z4 | Z4 | a | −N(piperazinyl)N−CH₃ | brown |
| 159 | Z4 | Z4 | b | −N(piperazinyl)N−CH₃ | brown |
| 160 | Z4 | Z4 | c | −NH−CH₂CH₂−NH₂ | brown |
| 161 | Z4 | Z4 | c | −N(piperazinyl)N−CH₂CH₂NH₂ | brown |
| 162 | Z4 | Z4 | c | −N(piperazinyl)N−CH₃ | brown |

TABLE 2-continued

| Example | $A_1$ | $A_2$ | $B_1$ | $Y_1$ | Shade on cotton |
|---|---|---|---|---|---|
| 163 | Z4 | Z4 | g | —N͡ ͡N—CH₃ | brown |
| 164 | Z4 | Z4 | g | —NH—CH₂CH₂CH₂—NH₂ | brown |

EXAMPLE 165

The procedure is as described in Steps a) and b) of Example 1 and the compound of the formula (103) is then salted out.

500 parts of water are added to 14.71 parts of the compound of the formula (103) thus obtainable, which has a content of 69.2%, and the mixture is initially introduced into the reaction vessel. 0.38 part of 1,3-diaminopropane is then added and the reaction solution is left at a temperature of 85° C. for about 20 hours, the pH being kept constant at a value of about 8.3 to 8.4 by addition of a 2 normal aqueous sodium hydroxide solution. The resulting product is separated out by addition of 50 parts of sodium chloride, filtered off and dried. A dye which, in the form of the free acid, has the formula

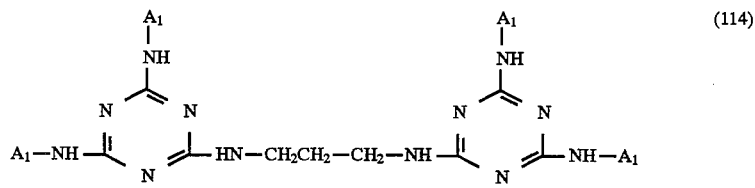

(114)

in which $A_1$ is a radical of the formula

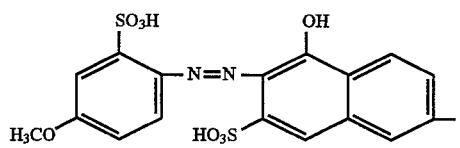

(112)

is obtained. The dye of the formula (114) dyes cotton in red shades.

EXAMPLE 116

The procedure is as described in steps a) and b) of Example 1, and 5.4 parts of 1,4-diaminobenzene are added to the resulting solution of the compound of the formula (103). The reaction solution is then left at a temperature of 80° C. for about 20 hours, the pH being kept constant at a value of about 6 to 7 by addition of a 2 normal aqueous sodium hydroxide solution. For separation, the product is salted out by addition of potassium chloride. The resulting product is then filtered off with suction and dried. A dye which, in the form of the free acid, has the formula

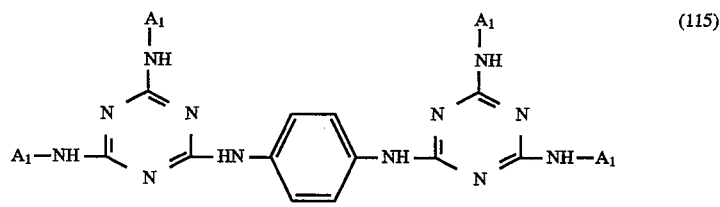

(115)

in which $A_1$ is a radical of the formula

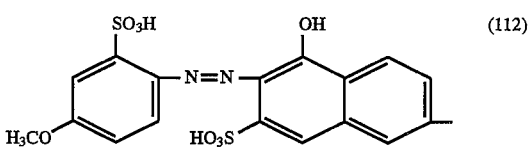

(112)

is obtained. The dye of the formula (115) dyes cotton in red shades.

EXAMPLES 167 to 180

Dyes of the general formula

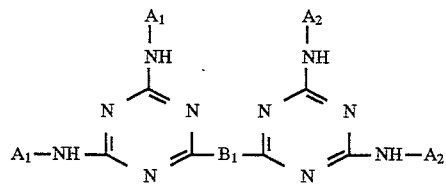

in which $A_1$, $A_2$ and $B_1$ are as defined in the following Table 3, can be obtained in an analogous manner to Example 165 or 166.

The dyes shown in the form of the free acid in Table 3 dye cotton in the shades stated in column 5 of Table 3.

The symbols A to Z6 for the radicals $A_1$ and $A_2$ and the symbols a to l for the bridge members $B_1$ are as defined above.

TABLE 3

| Example | $A_1$ | $A_2$ | $B_1$ | Shade on cotton |
|---|---|---|---|---|
| 167 | A | A | b | scarlet |
| 168 | A | A | i | scarlet |
| 169 | A | A | j | scarlet |
| 170 | A | A | h | scarlet |
| 171 | A | A | k | scarlet |
| 172 | A | F | i | red |
| 173 | I | F | i | bluish-tinged red |
| 174 | I | F | l | bluish-tinged red |
| 175 | I | F | a | bluish-tinged red |
| 176 | M | F | i | bluish-tinged red |
| 177 | M | M | i | bluish-tinged red |
| 178 | Q | F | l | claret |
| 179 | X | T | i | brown-orange |
| 180 | Z1 | Z1 | l | golden yellow |

EXAMPLE 181: The procedure is as described in steps a) and b) of Example 1 and the compound of the formula (103) is salted out.

150 parts of water are added to 14.71 parts of the compound of the formula (103) thus obtainable, which has a content of 69.2%, and the mixture is heated to a temperature of 85° C.

1.33 parts of 1,3-diaminopropane are then added, the pH rising to a value of about 10.5. The reaction solution is then heated at a temperature of 83° to 85° C. for about 18 hours. The pH is subsequently brought slowly to a value of 4.5 by means of acetic acid and the product which has precipitated out is filtered off with suction at a temperature of 60° C. and then dried. A dye mixture which comprises dyes, shown in the form of the free acids, of the formulae

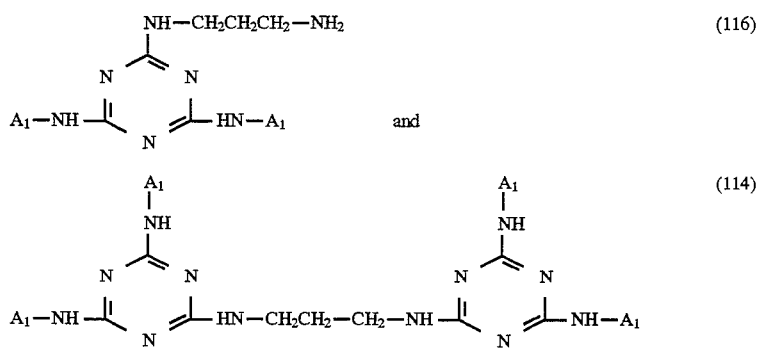

in a ratio of about 3:1, in which $A_1$ is a radical of the formula

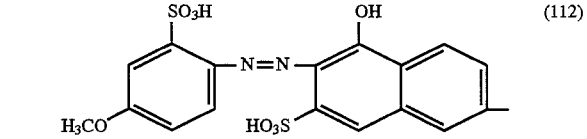

is obtained. The mixture of the dyes of the formulae (116) and (114) dyes cotton in red shades.

EXAMPLES 182 to 205: Dye mixtures which comprise a dye of the general formula

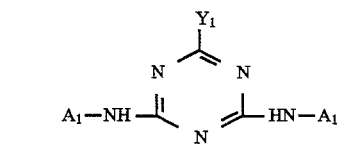

together with a dye of the general formula

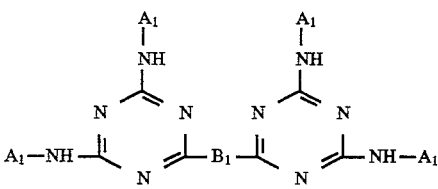

in which $A_1$, $B_1$ and $Y_1$ are as defined in the following Table 4, can be obtained in an analogous manner to Example 181. The dye mixtures shown in the form of the free acid in Table 4 dye cotton in the shades stated in column 5 of Table 4.

The symbols A to Z6 for the radicals $A_1$ are as defined above.

TABLE 4

| Example | $A_1$ | $B_1$ | $Y_1$ | Shade on cotton |
|---|---|---|---|---|
| 182 | A | —NH—CH$_2$—CH(OH)—CH$_2$—NH— | —NH—CH$_2$—CH(OH)—CH$_2$—NH$_2$ | scarlet |
| 183 | A | —N(piperazine)N—CH$_2$CH$_2$—NH— | —N(piperazine)N—CH$_2$CH$_2$—NH$_2$ | scarlet |
| 184 | A | —N(piperazine)N— | —N(piperazine)NH | scarlet |
| 185 | A | —NH—CH$_2$CH$_2$—NH— | —NH—CH$_2$CH$_2$—NH$_2$ | scarlet |
| 186 | F | —NH—CH$_2$CH$_2$CH$_2$—NH— | —NH—CH$_2$CH$_2$CH$_2$—NH$_2$ | bluish-tinged red |
| 187 | F | —NH—CH$_2$—CH(OH)—CH$_2$—NH— | —NH—CH$_2$—CH(OH)—CH$_2$—NH$_2$ | bluish-tinged red |
| 188 | F | —N(piperazine)N—CH$_2$CH$_2$—NH— | —N(piperazine)N—CH$_2$CH$_2$—NH$_2$ | bluish-tinged red |
| 189 | I | —NH—CH$_2$CH$_2$CH$_2$—NH— | —NH—CH$_2$CH$_2$CH$_2$—NH$_2$ | orange |
| 190 | B | —NH—CH$_2$CH$_2$CH$_2$—NH— | —NH—CH$_2$CH$_2$CH$_2$—NH$_2$ | pink |
| 191 | B | —NH—CH$_2$—CH(OH)—CH$_2$—NH— | —NH—CH$_2$—CH(OH)—CH$_2$—NH$_2$ | pink |
| 192 | M | —NH—CH$_2$CH$_2$CH$_2$—NH— | —NH—CH$_2$CH$_2$CH$_2$—NH$_2$ | pink |
| 193 | M | —N(piperazine)N— | —N(piperazine)NH | pink |
| 194 | Q | —NH—CH$_2$CH$_2$CH$_2$—NH— | —NH—CH$_2$CH$_2$CH$_2$—NH$_2$ | claret |
| 195 | Q | —N(piperazine)N—CH$_2$CH$_2$—NH— | —N(piperazine)N—CH$_2$CH$_2$—NH$_2$ | claret |
| 196 | R | —NH—CH$_2$CH$_2$CH$_2$—NH— | —NH—CH$_2$CH$_2$CH$_2$—NH$_2$ | lemon yellow |
| 197 | E | —NH—CH$_2$CH$_2$CH$_2$—NH— | —NH—CH$_2$CH$_2$CH$_2$—NH$_2$ | pink |
| 198 | X | —NH—CH$_2$CH$_2$CH$_2$—NH— | —NH—CH$_2$CH$_2$CH$_2$—NH$_2$ | brown |
| 199 | X | —NH—CH$_2$—CH(OH)—CH$_2$—NH— | —NH—CH$_2$—CH(OH)—CH$_2$—NH$_2$ | brown |
| 200 | Y | —NH—CH$_2$CH$_2$CH$_2$—NH— | —NH—CH$_2$CH$_2$CH$_2$—NH$_2$ | orange |
| 201 | Y | —N(piperazine)N—CH$_2$CH$_2$—NH— | —N(piperazine)N—CH$_2$CH$_2$—NH$_2$ | orange |
| 202 | U | —NH—CH$_2$CH$_2$CH$_2$—NH— | —NH—CH$_2$CH$_2$CH$_2$—NH$_2$ | lemon yellow |
| 203 | U | —N(piperazine)N— | —N(piperazine)NH | lemon yellow |
| 204 | Z1 | —NH—CH$_2$CH$_2$CH$_2$—NH— | —NH—CH$_2$CH$_2$CH$_2$—NH$_2$ | golden yellow |
| 205 | Z1 | —NH—CH$_2$CH$_2$—NH— | —NH—CH$_2$CH$_2$—NH$_2$ | golden yellow |

EXAMPLES 206 to 226: In each case 100 parts of the dye mixtures shown in the following Table 5, which dye cotton in the shades shown in the last column of Table 5, are prepared by mixing in a mixer.

TABLE 5

| Example | Dye mixture | Shade on cotton |
|---|---|---|
| 206 | Mixture of 75 parts of the dye according to Example 1 and 25 parts of the dye according to Example 168 | scarlet |
| 207 | Mixture of 50 parts of the dye according to Example 1 and 50 parts of the dye according to Example 168 | scarlet |
| 208 | Mixture of 60 parts of the dye according to Example 1 and 40 parts of the dye according to Example 169 | scarlet |
| 209 | Mixture of 85 parts of the dye according to Example 1 and 15 parts of the dye according to Example 169 | scarlet |
| 210 | Mixture of 70 parts of the dye according to Example 1 and 30 parts of the dye according to Example 170 | scarlet |
| 211 | Mixture of 50 parts of the dye according to Example 1 and 50 parts of the dye according to Example 170 | scarlet |
| 212 | Mixture of 25 parts of the dye according to Example 12 and 75 parts of the dye according to Example 172 | red |
| 213 | Mixture of 15 parts of the dye according to Example 70 and 85 parts of the dye according to Example 179 | red |
| 214 | Mixture of 95 parts of the dye according to Example 39 and 5 parts of the dye according to Example 176 | bluish-tinged red |
| 215 | Mixture of 5 parts of the dye according to Example 47 and 95 parts of the dye according to Example 178 | bluish-tinged red |
| 216 | Mixture of 30 parts of the dye according to Example 20 and 70 parts of the dye according to Example 173 | bluish-tinged red |
| 217 | Mixture of 90 parts of the dye according to Example 18 and 10 parts of the dye according to Example 174 | bluish-tinged red |
| 218 | Mixture of 10 parts of the dye according to Example 35 and 90 parts of the dye according to Example 177 | bluish-tinged red |
| 219 | Mixture of 70 parts of the dye according to Example 18 and 30 parts of the dye according to Example 174 | bluish-tinged red |
| 220 | Mixture of 55 parts of the dye according to Example 114 and 45 parts of the dye according to Example 177 | pink |
| 221 | Mixture of 50 parts of the dye according to Example 39 and 50 parts of the dye according to Example 176 | bluish-tinged red |
| 222 | Mixture of 80 parts of the dye according to Example 114 and 20 parts of the dye according to Example 177 | pink |
| 223 | Mixture of 60 parts of the dye according to Example 47 and 40 parts of the dye according to Example 184 | claret |
| 224 | Mixture of 50 parts of the dye according to Example 20 and 50 parts of the dye according to Example 173 | bluish-tinged red |
| 225 | Mixture of 40 parts of the dye according to Example 12 and 60 parts of the dye according to Example 172 | red |
| 226 | Mixture of 50 parts of the dye according to Example 70 and 50 parts of the dye according to Example 179 | brown-orange |

Dyeing instructions 1

10 parts of cotton fabric (bleached and mercerized) are introduced at about 30° C. into a dyebath which comprises 200 parts of water and 0.35 part of the dye of Example 1. The liquor is heated to 95° C. in the course of 30 minutes and left at this temperature for 15 minutes. 4 parts of sodium sulfate are then added and dyeing is continued at 95° C. for a further 45 minutes. Thereafter, the dyebath is cooled to 80° C. in the course of 15 minutes and left at this temperature for a further 15 minutes. The dyeing is then rinsed thoroughly with cold water and dried.

Dyeing instructions 2

10 parts of a fibre mixture of polyester and cotton are introduced at about 50° C. into a dyebath which comprises 200 parts of water, a dye mixture comprising 0.2 part of C.I. Direct Red 60 and 0.2 part of the dye mixture according to Example 181, 0.4 part of ammonium sulfate and 0.2 part of an anionic dispersant (for example formaldehyde condensation product of naphthalenesulfonic acid). The dyebath is brought to a pH of 5.5 with formic acid, 1 part of sodium sulfate is added and the bath is then heated to about 130° C. in the course of 45 minutes. Dyeing is continued at 130° C. for 45 minutes and the dyebath is then cooled to about 80° C. in the course of 30 minutes and left at this temperature for a further 45 minutes. The dyeing is then rinsed thoroughly with cold water and dried.

Dyeing instructions 3

The procedure is as described in dyeing instructions 1 or 2, but after the dyeing operation has ended, the dyeing, which has been rinsed cold, is introduced into a fresh bath, heated at about 30° C., which comprises 200 parts of water and 0.2–0.6 part of a cationic after-treatment agent (amine-formaldehyde dicyandiamide condensation product or formulation based on dicyandiamide and diethylenetriamine). The dyeing is after-treated at 30° C. for 30 minutes and then dried without a further rinsing process; a dyeing having improved wet fastness properties is obtained.

Dyeing instructions 4

The procedure is as described in dyeing instructions 1 or 2, but after the dyeing operation has ended, the dyeing, which has been rinsed cold, is introduced into a fresh bath, heated at about 25° C., which comprises 200 parts of water, 1 part of sodium sulfate and 0.6 part of a fibre-reactive cationic after-treatment agent based on N-methyldialkylamine and epichlorohydrin. The temperature is increased to 40° C. in the course of 15 minutes, 0.8 part of 30% sodium hydroxide solution is added and the dyeing is treated at 40° C. for a further 45 minutes. The dyeing is then rinsed hot and dried; it has improved wet fastness properties.

What is claimed is:

1. An anionic acid dye of the formula

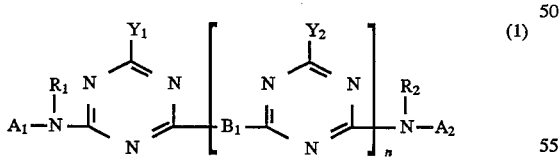
(1)

in which $R_1$ and $R_2$ independently of one another are hydrogen or $C_1$–$C_4$alkyl, $B_1$ is an aliphatic or aromatic bridge member, $A_1$ and $A_2$ independently of one another are the radical of a monoazo- or disazo dye or the radical of a metal complex azo dye, n is the number 0 or 1 and $Y_1$ and $Y_2$ independently of one another are a radical of the formula

(3a)

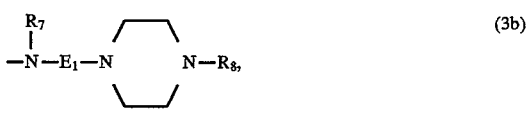
(3b)

(3c)

(3d)

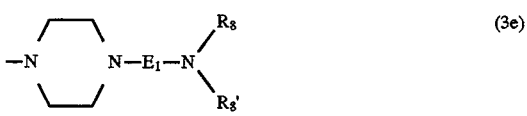
(3e)

in which $R_7$, $R_8$ and $R_8'$ independently of one another are hydrogen or $C_1$–$C_8$alkyl which is unsubstituted or substituted by hydroxyl, $C_1$–$C_4$alkoxy, halogen, amino or sulfato, and $E_1$ is $C_2$–$C_8$alkylene which is unsubstituted or substituted by hydroxyl, $C_1$–$C_4$alkoxy, halogen, amino or sulfato and is uninterrupted or interrupted by one or more groups -O-, or $C_5$–$C_7$cycloalkylene, $C_5$–$C_7$cycloalkylene-$C_1$–$C_8$alkylene or $C_1$–$C_8$alkylene-$C_5$–$C_7$cycloalkylene, each of which is unsubstituted or substituted in the alkylene radical by hydroxyl or $C_1$–$C_4$alkoxy and in the cycloalkyl ring by $C_1$–$C_4$alkyl, and in which dye of formula (1) the number of sulfo groups is greater than the number of cationic groups and basic groups.

2. An anionic acid dye according to claim 1, in which $R_1$ and $R_2$ are hydrogen.

3. An anionic acid dye according to claim 1, in which $B_1$ is a bridge member of the formula

(5a)

(5b)

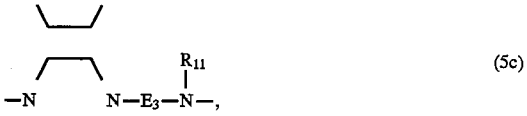
(5c)

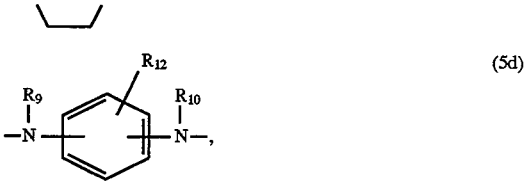
(5d)

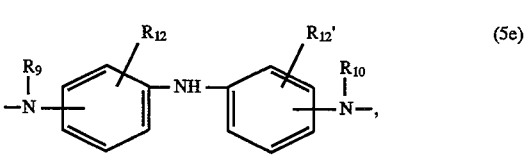
(5e)

-continued

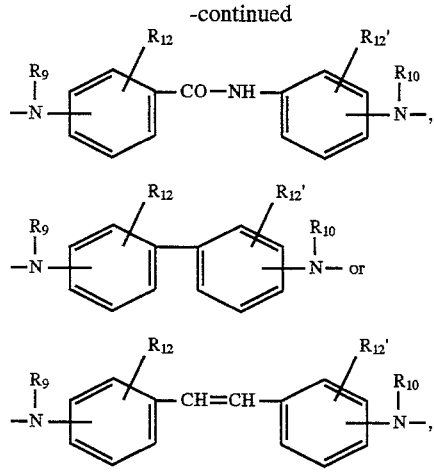

in which

R$_9$, R$_{10}$ and R$_{11}$ independently of one another are hydrogen or C$_1$–C$_8$alkyl which is unsubstituted or substituted by hydroxyl or C$_1$–C$_4$alkoxy, R$_{12}$ and R$_{12}$' independently of one another are hydrogen, C$_1$–C$_4$alkyl, C$_1$–C$_4$alkoxy, C$_2$–C$_4$alkanoylamino, halogen, sulfo or carboxyl and E$_2$ and E$_3$ independently of one another are C$_2$–C$_8$alkylene which is unsubstituted or substituted by hydroxyl or C$_1$–C$_4$alkoxy and uninterrupted or interrupted by one or more groups -O-, or C$_5$–C$_7$cycloalkylene, C$_5$–C$_7$cycloalkylene-C$_1$–C$_8$alkylene or C$_1$–C$_8$alkylene-C$_5$–C$_7$cycloalkylene which are unsubstituted or substituted by C$_1$–C$_4$alkyl in the cycloalkyl ring.

4. An anionic acid dye according to claim 1, in which n is the number 0.

5. An anionic acid dye according to claim 1, in which R$_7$, R$_8$ and R$_8$' independently of one another are hydrogen or C$_1$–C$_4$alkyl which is unsubstituted or substituted by hydroxyl or C$_1$–C$_4$alkoxy and E$_1$ is C$_2$–C$_8$alkylene which is unsubstituted or substituted by hydroxyl or C$_1$–C$_4$alkoxy and uninterrupted or interrupted by one or more groups -O-, or C$_5$–C$_7$cycloalkylene, C$_5$–C$_7$cycloalkylene-C$_1$–C$_8$alkylene or C$_1$–C$_8$alkylene-C$_5$–C$_7$cycloalkylene which are unsubstituted or substituted by C$_1$–C$_4$alkyl in the cycloalkyl ring.

6. An anionic acid dye according to claim 1, in which A$_1$ and A$_2$ independently of one another are a radical of the formula

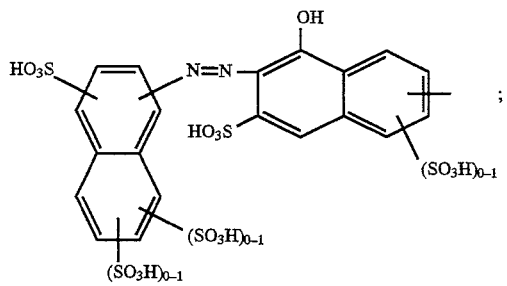

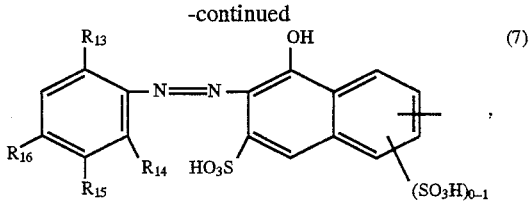

in which

R$_{13}$, R$_{14}$, R$_{15}$ and R$_{16}$ independently of one another are hydrogen, sulfo, carboxyl, carbamoyl, halogen, cyano or ureido, C$_1$–C$_4$alkyl or C$_1$–C$_4$alkoxy which are unsubstituted or substituted by hydroxyl, or C$_2$–C$_4$alkanoylamino which is unsubstituted or substituted by hydroxyl or C$_1$–C$_4$alkoxy in the alkyl part;

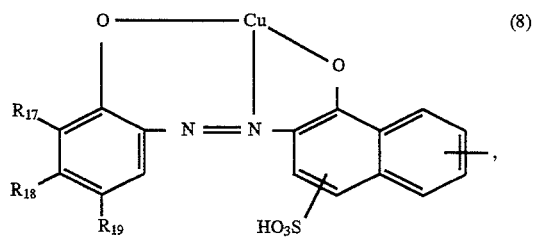

in which

R$_{17}$, R$_{18}$ and R$_{19}$ have the definitions assigned above to R$_{13}$, R$_{14}$, R$_{15}$ and R$_{16}$;

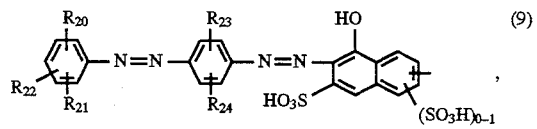

in which

R$_{20}$, R$_{21}$, R$_{22}$, R$_{23}$ and R$_{24}$ have the definitions assigned above to R$_{13}$, R$_{14}$, R$_{15}$ and R$_{16}$;

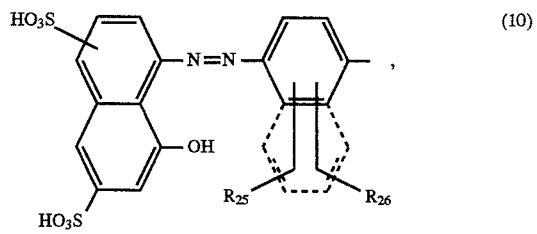

in which

R$_{25}$ and R$_{26}$ have the definitions assigned above to R$_{13}$, R$_{14}$, R$_{15}$ and R$_{16}$;

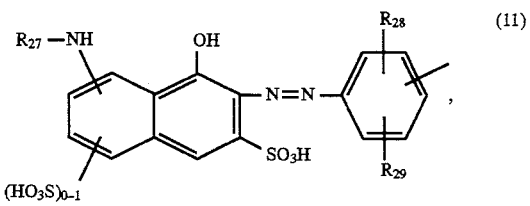

in which

R$_{27}$ is hydrogen, C$_2$–C$_6$alkanoyl which is unsubstituted or substituted by hydroxyl or C$_1$–C$_4$alkoxy, or phenyl or benzoyl which are unsubstituted or substituted by C$_1$–C$_4$alkyl, C$_1$–C$_4$alkoxy, C$_2$–C$_4$alkanoylamino, sulfo, carboxyl, halogen, cyano or ureido in the phenyl ring, and R$_{28}$ and R$_{29}$ have the definitions assigned above to R$_{13}$, R$_{14}$, R$_{15}$ and R$_{16}$;

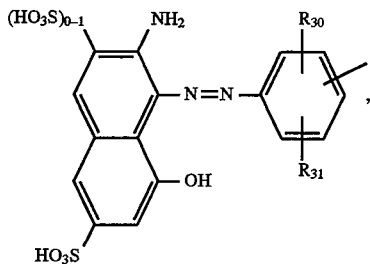

(12)

in which

R$_{30}$ and R$_{31}$ have the definitions assigned above to R$_{13}$, R$_{14}$, R$_{15}$ and R$_{16}$;

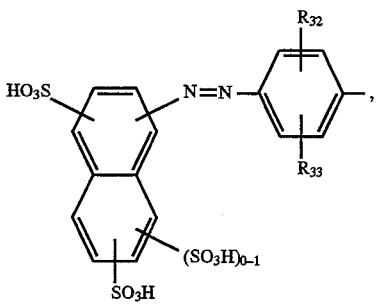

(13)

in which

R$_{32}$ and R$_{33}$ have the definitions assigned above to R$_{13}$, R$_{14}$, R$_{15}$ and R$_{16}$;

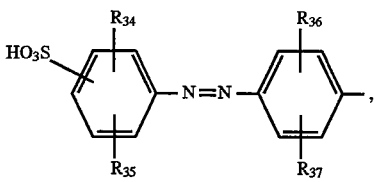

(14)

in which

R$_{34}$, R$_{35}$, R$_{36}$ and R$_{37}$ have the definitions assigned above to R$_{13}$, R$_{14}$, R$_{15}$ and R$_{16}$; or

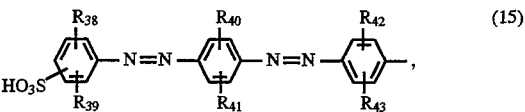

(15)

in which

R$_{38}$, R$_{39}$, R$_{40}$, R$_{41}$, R$_{42}$ and R$_{43}$ have the definitions assigned above to R$_{13}$, R$_{14}$, R$_{15}$ and R$_{16}$.

7. An anionic acid dye according to claim 6, in which A$_1$ and A$_2$ independently of one another are a radical of the formula (6), (7), (8), (9), (10), (11), (12) or (14).

8. An anionic acid dye according to claim 6, in which n is the number 0,

R$_7$, R$_8$ and R$_8$' are hydrogen or C$_1$–C$_4$alkyl which is unsubstituted or substituted by hydroxyl or C$_4$–C$_4$alkoxy, E$_1$ is C$_2$–C$_8$alkylene which is unsubstituted or substituted by hydroxyl or C$_1$–C$_4$alkoxy and A$_1$ and A$_2$ independently of one another are a radical of the formula (6), (7), (8), (9), (10), (11), (12) or (14), and A$_1$ and A$_2$ have identical meanings.

* * * * *